(12) United States Patent
Lim et al.

(10) Patent No.: US 10,924,955 B2
(45) Date of Patent: Feb. 16, 2021

(54) METHOD FOR REPORTING CHANNEL INFORMATION IN WIRELESS LAN SYSTEM AND DEVICE THEREFOR

(71) Applicant: LG ELECTRONICS INC., Seoul (KR)

(72) Inventors: Dongguk Lim, Seoul (KR); Eunsung Park, Seoul (KR); Sunwoong Yun, Seoul (KR); Hangyu Cho, Seoul (KR); Jinsoo Choi, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 0 days.

(21) Appl. No.: 16/461,345

(22) PCT Filed: Nov. 15, 2017

(86) PCT No.: PCT/KR2017/012919
§ 371 (c)(1),
(2) Date: May 15, 2019

(87) PCT Pub. No.: WO2018/093132
PCT Pub. Date: May 24, 2018

(65) Prior Publication Data
US 2020/0059808 A1    Feb. 20, 2020

Related U.S. Application Data

(60) Provisional application No. 62/423,779, filed on Nov. 18, 2016.

(51) Int. Cl.
*H04W 24/10* (2009.01)
*H04B 7/06* (2006.01)
(Continued)

(52) U.S. Cl.
CPC .......... *H04W 24/10* (2013.01); *H04B 7/0626* (2013.01); *H04W 72/04* (2013.01);
(Continued)

(58) Field of Classification Search
None
See application file for complete search history.

(56) References Cited

U.S. PATENT DOCUMENTS

| 2014/0056205 A1* | 2/2014 | Aboul-Magd | H04W 28/16 |
| | | | 370/312 |
| 2014/0086200 A1* | 3/2014 | Seok | H04L 5/003 |
| | | | 370/330 |

(Continued)

FOREIGN PATENT DOCUMENTS

| WO | 2016167608 | 10/2016 |
| WO | 2018151888 | 8/2018 |

OTHER PUBLICATIONS

European Patent Office Application Serial No. 17871416.8, Search Report dated Oct. 11, 2019, 8 pages.

(Continued)

*Primary Examiner* — Chi H Pham
*Assistant Examiner* — Vladislav Y Agureyev
(74) *Attorney, Agent, or Firm* — Lee Hong Degerman Kang Waimey

(57) ABSTRACT

A method for reporting channel information by a station (STA) in a wireless LAN (WLAN) system according to an embodiment of the present invention comprises the steps of: receiving a null data packet announcement (NDP-A) frame from a first access point (AP); when it is determined that the NDP-A frame is for joint transmission of a plurality of APs, measuring a channel for a first AP having transmitted the NDP-A frame and a channel for at least one second AP channel which has not transmitted the NDP-A frame; and
(Continued)

transmitting channel information for the plurality of APs, which has been acquired according to a result of the channel measurement, to the first AP, wherein when the NDP-A frame is for the joint transmission, the STA can acquire channel information relating to the plurality of APs through a plurality of NDP frames received from the plurality of APs after receiving the NDP-A frame one time.

7 Claims, 19 Drawing Sheets

(51) Int. Cl.
*H04W 72/04* (2009.01)
*H04B 7/0413* (2017.01)
*H04L 5/00* (2006.01)
*H04W 84/12* (2009.01)

(52) U.S. Cl.
CPC .......... *H04B 7/0413* (2013.01); *H04L 5/0007* (2013.01); *H04W 72/0446* (2013.01); *H04W 84/12* (2013.01)

(56) References Cited

U.S. PATENT DOCUMENTS

| | | | |
|---|---|---|---|
| 2015/0295629 A1 | 10/2015 | Xia et al. | |
| 2016/0112913 A1* | 4/2016 | Malkamaki | H04W 16/32 455/444 |
| 2016/0174206 A1* | 6/2016 | Xia | H04B 7/063 370/329 |
| 2016/0286477 A1 | 9/2016 | Lin et al. | |
| 2016/0295581 A1* | 10/2016 | Ghosh | H04L 5/0092 |
| 2016/0316424 A1* | 10/2016 | Jia | H04L 1/1607 |
| 2016/0323424 A1* | 11/2016 | Merlin | H04L 5/0048 |
| 2016/0365954 A1* | 12/2016 | Lee | H04L 5/0073 |
| 2017/0063512 A1* | 3/2017 | Wu | H04L 5/0048 |
| 2017/0111924 A1* | 4/2017 | Josiam | H04L 5/0057 |
| 2017/0163315 A1* | 6/2017 | Wu | H04B 7/0617 |
| 2017/0251332 A1* | 8/2017 | Aldana | G01S 5/0226 |
| 2017/0273112 A1* | 9/2017 | Lou | H04W 72/121 |
| 2017/0279507 A1* | 9/2017 | Kim | H04B 7/0617 |
| 2017/0290045 A1* | 10/2017 | Nair | H04L 27/0006 |
| 2017/0311325 A1* | 10/2017 | Cariou | H04B 7/0408 |
| 2018/0263043 A1* | 9/2018 | Zhou | H04B 7/0413 |
| 2018/0263045 A1* | 9/2018 | Zhou | H04W 72/12 |
| 2018/0292518 A1* | 10/2018 | Chu | G01S 13/765 |
| 2019/0081664 A1* | 3/2019 | Vermani | H04B 7/0417 |
| 2019/0191325 A1* | 6/2019 | Du | H04W 72/085 |
| 2020/0007283 A1* | 1/2020 | Chen | H04B 7/06 |

OTHER PUBLICATIONS

PCT International Application No. PCT/KR2018/093132, International Search Report dated Mar. 6, 2018, 4 pages.

* cited by examiner

FIG. 5
(a) 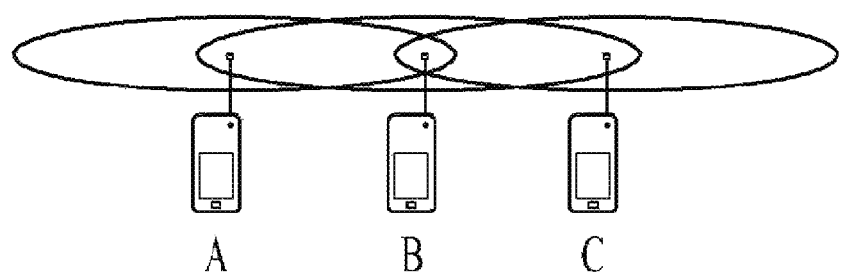
(b) 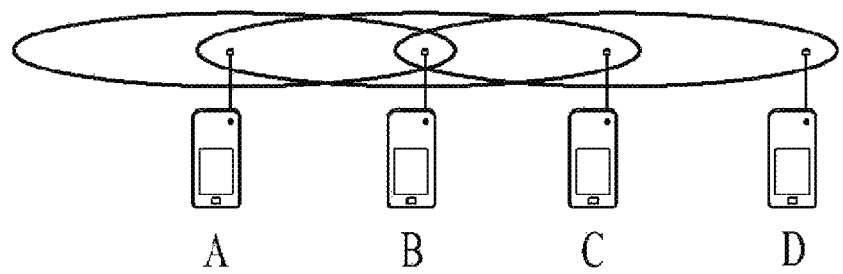

FIG. 6
(a)
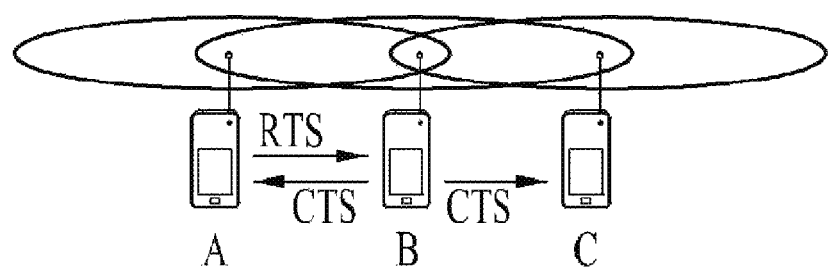
(b)
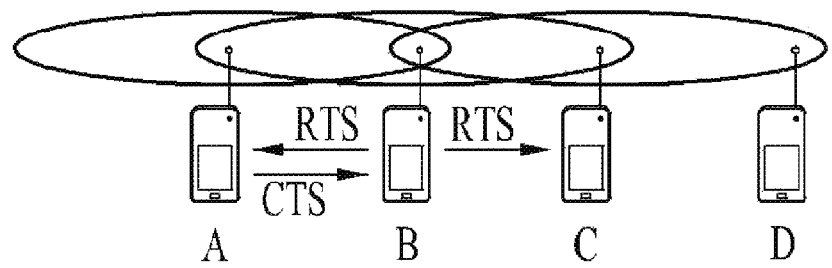

FIG. 11

| B0 B2 B3 | B5 B6 | B7 B8 | B9 | B10 | B11 | B12 B14 | B15 | B16 B17 | B18 B23 |
|---|---|---|---|---|---|---|---|---|---|
| Nc Index | Nr Index | Channel Width | Grouping | Codebook Information | Feedback Type | Remaining Feedback Segments | First Feedback Segment | Reserved | Sounding Dialog Token Number |
| Bits: 3 | 3 | 2 | 2 | 1 | 1 | 3 | 1 | 2 | 6 |

METHOD FOR REPORTING CHANNEL INFORMATION IN WIRELESS LAN SYSTEM AND DEVICE THEREFOR

CROSS-REFERENCE TO RELATED APPLICATIONS

This application is the National Stage filing under 35 U.S.C. 371 of International Application No. PCT/KR2017/012919, filed on Nov. 15, 2017, which claims the benefit of U.S. Provisional Application No. 62/423,779, filed on Nov. 18, 2016, the contents of which are all hereby incorporated by reference herein in their entirety.

BACKGROUND OF THE INVENTION

Field of the Invention

The present invention relates to a wireless LAN (WLAN) system, and more particularly, to a method of measuring and reporting channel information for a plurality of access points (APs), and a device for the method.

Related Art

A standard for the wireless LAN technology is being developed as an Institute of Electrical and Electronics Engineers (IEEE) 802.11 standard. IEEE 802.11a and b use an unlicensed band in 2.4. GHz or 5 GHz. And, IEEE 802.11b provides a transmission rate of 11 Mbps, and IEEE 802.11a provides a transmission rate of 54 Mbps. And, IEEE 802.11g provides a transmission rate of 54 Mbps by applying orthogonal frequency-division multiplexing (OFADM). IEEE 802.11n provides a transmission rate of 300 Mbps on 4 spatial streams by applying multiple input multiple output-OFDM (MIMO-OFDM). The IEEE 802.11n supports a channel bandwidth of up to 40 MHz, and, in this case, the IEEE 802.11n provides a transmission rate of 600 Mbps.

The above-described wireless LAN (WLAN) standard was previously defined as the IEEE 802.11ac standard, which uses a maximum bandwidth of 160 MHz, supports 8 spatial streams, and supports a maximum rate of 1 Gbit/s. And, discussions are now being made on the IEEE 802.11ax standardization.

SUMMARY OF THE INVENTION

The present invention provides a method of measuring and reporting channel information for joint transmission (JT) by a plurality of access points (APs), and a device for the method.

The present invention is not limited to the technical problems described above, and other technical problems can be inferred from embodiments of the present invention.

According to an aspect of the present invention, a method of reporting channel information by a station (STA) in a wireless LAN (WLAN) system may include: receiving a null data packet announcement (NDP-A) frame from a first access point (AP); upon determining that the NDP-A frame is for joint transmission of a plurality of APs, measuring a channel for a first AP which has transmitted the NDP-A frame and a channel for at least one second AP channel which has not transmitted the NDP-A frame; and transmitting channel information for the plurality of APs, which has been acquired according to/based on a result of the channel measurement, to the first AP, wherein if the NDP-A frame is for the joint transmission, the STA acquires the channel information for the plurality of APs through a plurality of NDP frames received from the plurality of APs after receiving the NDP-A frame one time.

According to another aspect of the present invention, an STA may include: a receiver; a transmitter; and a processor for receiving an NDP-A frame from a first AP through the receiver, measuring a channel for a first AP which has transmitted the NDP-A frame and a channel for at least one second AP channel which has not transmitted the NDP-A frame upon determining that the NDP-A frame is for joint transmission of a plurality of APs, and transmitting channel information for the plurality of APs, which has been acquired according to/based on a result of the channel measurement, to the first AP through the transceiver, wherein if the NDP-A frame is for the joint transmission, the processor acquires the channel information for the plurality of APs through a plurality of NDP frames received from the plurality of APs after receiving the NDP-A frame one time.

The NDP-A frame may include at least one of an STA information field including an identifier of the STA, a joint transmission indicator including information on whether the NDP-A frame is for the joint transmission of the plurality of APs, an antenna configuration field, and a number of spatial streams.

For example, the STA may receive the plurality of NDP frames simultaneously from the plurality of APs after short inter-frame space (SIFS) from the NDP-A reception. The antenna configuration field of the NDP-A frame may include the number of transmission antennas for all of the plurality of APs, and the number of spatial streams of the NDP-A frame may indicate/include the number of spatial streams for all of the plurality of APs.

For another example, the STA may receive the plurality of NDP frames sequentially from the plurality of APs according to/based on a specific IFS interval after SIFS from the NDP-A reception. An antenna configuration field of the NDP-A frame may include the number of transmission antennas for each AP, and the number of spatial streams of the NDP-A frame may indicate/include the number of spatial streams for each AP. In addition, the NDP-A frame may further include information on the total number of the plurality of NDP frames.

The STA may receive a trigger frame from the first AP after reception of the plurality of NDP frames. Channel information on the plurality of APs may be transmitted through a resource allocated through the trigger frame.

A last NDP frame of the plurality of NDP frames may include an indicator indicating/for the end of NDP frame transmission.

The first AP may be a master AP among the plurality of APs, and the at least one second AP may be a slave AP among the plurality of APs.

According to an embodiment of the present invention, a plurality of NDP frames are transmitted one time by a plurality of APs on the basis of an NDP-A frame for channel information for joint transmission (JT), and an STA collectively reports the channel information for the plurality of APs, thereby decreasing latency and overhead depending on channel information measurement and feedback.

In addition to the aforementioned technical advantages, other technical advantages can be inferred from embodiments of the present invention.

BRIEF DESCRIPTION OF THE DRAWINGS

FIG. 5 is a diagram for explaining a hidden node and an exposed node.

FIG. 6 is a drawing for explaining RTS and CTS.

FIG. 11 shows a VHT MIMO control field of a VHT compressed beamforming frame.

DESCRIPTION OF EXEMPLARY EMBODIMENTS

Hereinafter, the preferred embodiment of the present invention will be described in detail with reference to the appended drawings. The detailed description that will hereinafter be disclosed along with the appended drawings will only be provided to describe an exemplary embodiment of the present invention. And, therefore, it should be understood that the exemplary embodiment presented herein will not represent the only embodiment for carrying out the present invention.

The following detailed description includes specific details for providing a full understanding of the present invention. However, it will be apparent to anyone skilled in the art that the present invention can be carried out without referring to the above-mentioned specific details. In some cases, in order to avoid any ambiguity in the concept of the present invention, the disclosed structure and device may be omitted, or the disclosed structure and device may be illustrated as a block diagram based on their core functions.

As described above, the following description relates to a method for efficiently utilizing a channel with a wide band in a wireless LAN (WLAN) system, and a device for the method. To this end, the WLAN system to which the present invention is applied will be described in detail.

Figure 1:
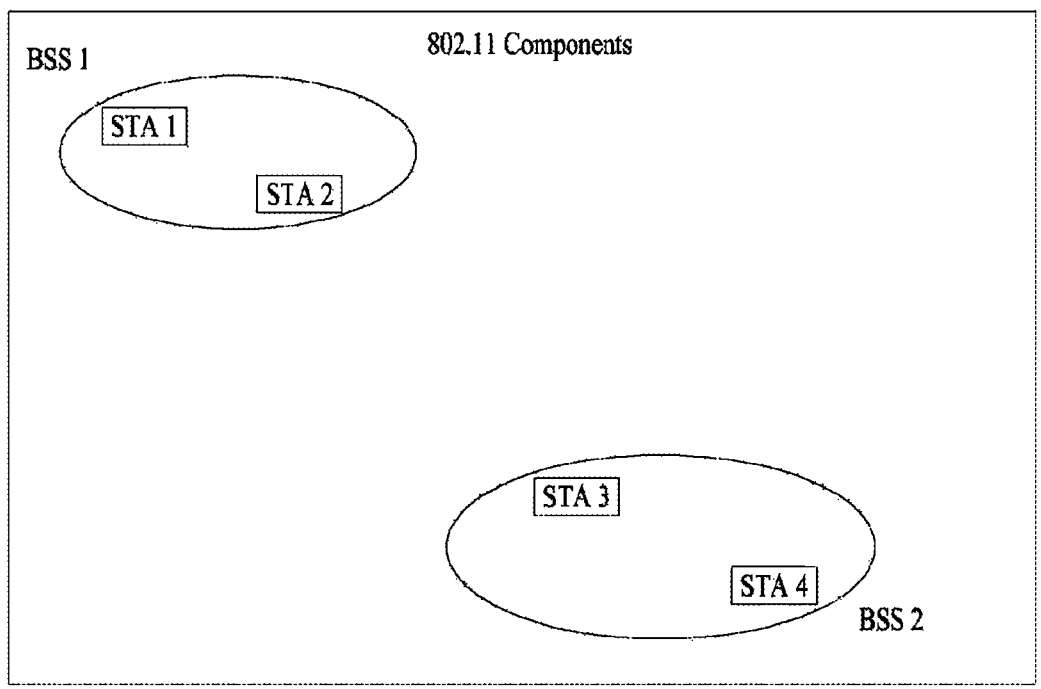
FIG. 1 is a diagram showing an exemplary configuration of a wireless LAN (WLAN) system.

FIG. 1 is a diagram showing an exemplary configuration of a wireless LAN (WLAN) system.

As shown in FIG. 1, a wireless LAN (WLAN) includes one or more Basic Service Set (BSS). A BSS is a set (or group) of stations (STAs) that successfully achieve synchronization so as to communication with one another.

As a logical entity including a Medium Access Control (MAC) and a Physical Layer interface for a wireless medium, an STA includes an access point (AP) and a non-AP Station. Among the STAs, a portable device (or terminal) that is operated by a user corresponds to a non-AP Station. And, therefore, when an entity is simply mentioned to as an STA, the STA may also refer to a non-AP Station. Herein, the non-AP Station may also be referred to as other terms, such as a terminal, a wireless transmit/receive unit (WTRU), a user equipment (UE), a mobile station (MS), a mobile terminal, a mobile subscriber unit, and so on.

Additionally, the AP is an entity providing its associated station (STA) with an access to a distribution system (DS) through a wireless medium. Herein, the AP may also be referred to as a centralized controller, a base station (B), a Node-B, a base transceiver system (BTS), a personal basic service set central point/access point (PCP/AP), a site controller, and so on.

A BSS may be categorized as an infrastructure BSS and an independent BSS (IBSS).

The BSS shown in FIG. 1 corresponds to an IBSS. The IBSS refers to a BSS that does not include an AP. And, since the BSS does not include an AP, access to the DS is not authorized (or approved), and, therefore, the IBSS functions as a self-contained network.

Figure 2:
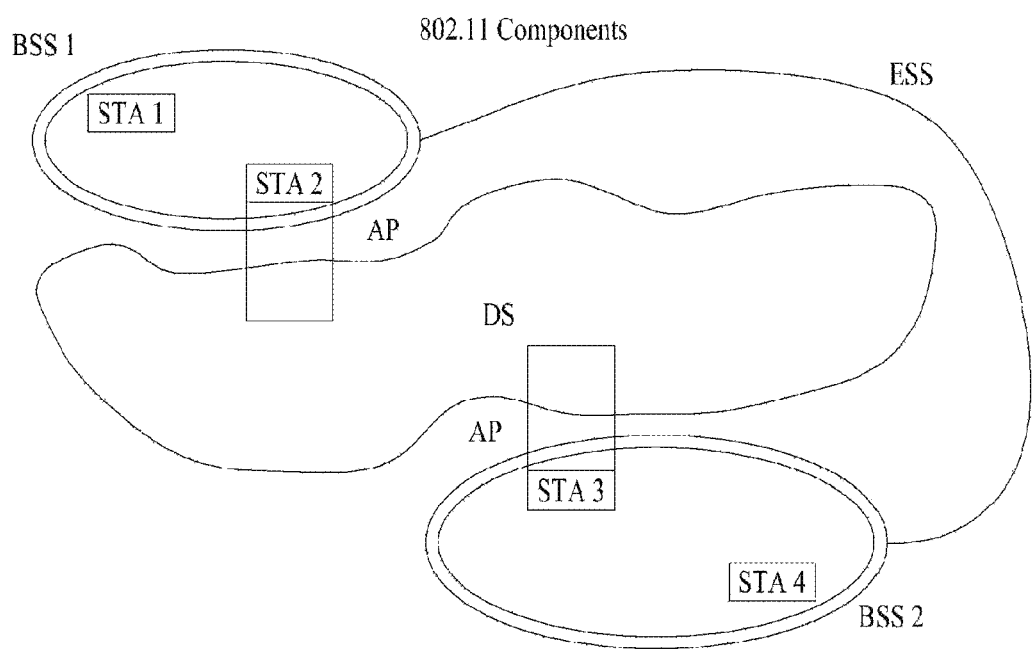
FIG. 2 is a diagram showing another exemplary configuration of a wireless LAN (WLAN) system.

FIG. 2 is a diagram showing another exemplary configuration of a wireless LAN (WLAN) system.

The BSS shown in FIG. 2 corresponds to an infrastructure BSS. The infrastructure BSS includes one or more STAs and APs. As a rule, although the communication between non-AP STAs is established by passing through the AP, in case a direct link is configured between the non-AP STAs, direct communication may also be established between the non-AP STAs.

As shown in FIG. 2, a plurality of infrastructure BSSs may be interconnected to one another through the DS. The plurality of BSSs being interconnected to one another through the DS is collectively referred to as an extended service set (ESS). The STAs being included in the ESS may perform communication between one another, and, a non-AP STA may shift (or relocate) from one BSS to another BSS within the same ESS while performing uninterrupted communication.

As a mechanism that connects the plurality of APs, the DS is not necessarily required to correspond to a network. As long as the DS is capable of providing a predetermined distribution service, there is no limitation in the structure or configuration of the DS. For example, the DS may correspond to a wireless network, such as a mesh network, or the DS may correspond to a physical structure (or entity) that connects the APs to one another.

Layer Structure

An operation of an STA operating in a WLAN system may be described in terms of a layer structure. The layer structure may be implemented by a processor in terms of a device configuration. The STA may have a multi-layer structure. For example, a layer structure in the 802.11 standard document is a MAC sublayer and a physical (PHY) layer on a data link layer (DLL). The PHY layer may include a physical layer convergence procedure (PLCP) entity, a physical medium dependent (PMD) entity, or the like. The MAC sublayer and the PHY layer include management entities referred to as a MAC sublayer management entity (MLME) and a physical layer management entity (PLME), respectively. Those entities provide a layer management service interface in which a layer management function operates.

In order to provide an accurate MAC operation, a station management entity (SME) exists in each STA. The SME is a layer-independent entity which may be present in a separate management plane or which may be seen to be off to the side. Although accurate functions of the SME are not described in detail in the present document, in general, it may be seen that the functions are for collecting a layer-dependent state from various layer management entities (LMEs), for setting layer-specific parameters to have similar values, or the like. In general, the SME may perform those functions on behalf of a general system management entity, and may implement a standard management protocol.

The aforementioned entities interact in various manners. For example, the interaction between the entities may be achieved by exchanging GET/SET primitives. The primitive implies a set of parameters or elements related to a specific purpose. An XX-GET.request primitive is used to request for a value of a given MIB attribute (attribute information based on management information). An XX-GET.confirm primitive is used to return a proper MIB attribute information value if a status is "success", and otherwise to return an error indication in a status field. An XX-SET.request primitive is used such that an indicated MIB attribute is set to a given value. When the MIB attribute implies a specific operation, it is a request for performing the operation. In addition, an XX-SET.confirm primitive is used to confirm that an indicated MIB attribute is set to a requested value if a status is "success", and otherwise to return an error condition in a status field. When the MIB attribute implies a specific operation, it is confirmed that the operation has been performed.

In addition, the MLME and the SME may exchange various MLME_GET/SET primitives through an MLME_SAP(Service Access Point). In addition, the various PLME_GET/SET primitives may be exchanged between the PLME and the SME through the PLME_SAP, and may be exchanged between the MLME and the PLME through the MLME-PLME_SAP.

Link Setup Process

Figure 3:
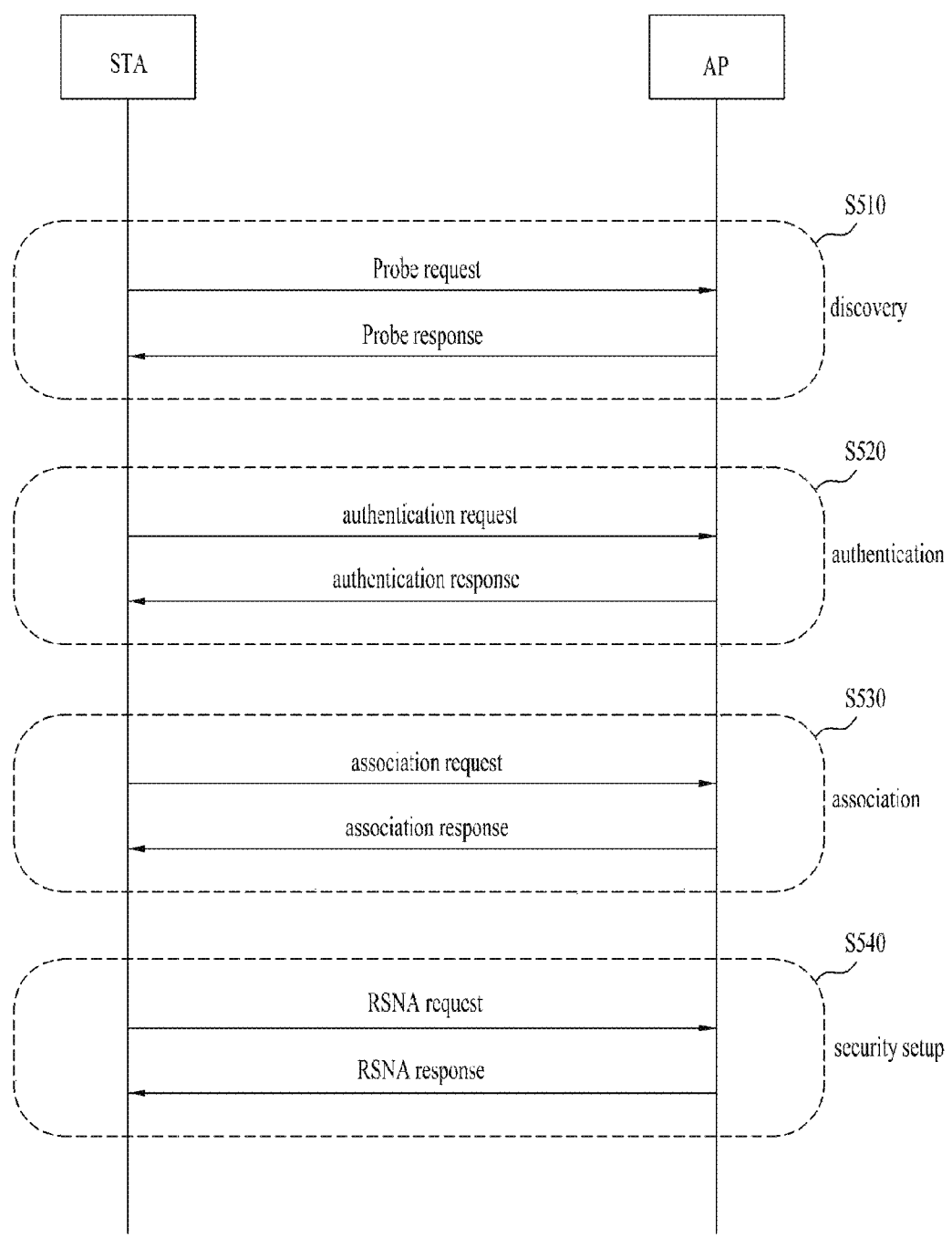
FIG. 3 is a drawing for explaining a typical link setup process.

FIG. 3 is a drawing for explaining a typical link setup process.

In order for an STA to set up a link for a network, the STA shall first discover the network, perform authentication, establish an association, and be subjected to an authentication procedure or the like for security. The link setup process may be referred to as a session initiation process or a session setup process. In addition, the process of discovery, authentication, association, and security configuration of the link setup process may be collectively referred to as an association process.

Referring to FIG. 3, an exemplary link setup process will be described.

In step S510, an STA may perform a network discovery operation. The network discovery operation may include a scanning operation of the STA. That is, a joinable network shall be found in order for the STA to have access to the network. The STA shall identify a compatible network before joining a wireless network, and a process of identifying a network existing in a specific region is called scanning.

The scanning includes active scanning and passive scanning.

The network discovery operation including the active scanning process is shown as an example in FIG. 3. In the active scanning, an STA performing the scanning transmits a probe request frame to discover a nearby AP while moving between channels, and waits for a response thereto. In response to the probe request frame, a responder transmits a probe response frame to the STA which has transmitted the probe request frame. Herein, the responder may be an STA which has lastly transmitted a beacon frame in a BSS of a channel being scanned. In the BSS, an AP is the responder since the AP transmits the beacon frame. In an IBSS, the responder is not constant since STAs in the IBSS transmit the beacon frame in turn. For example, an STA which has transmitted a probe request frame in a channel #1 and has received a probe response frame in the channel #1 may store BSS-related information included in the received probe response frame and move to a next channel (e.g., a channel #2) to perform scanning (i.e., probe request/response transmission and reception on the channel #2) in the same manner.

Although not shown in FIG. 3, the scanning operation may be performed in a passive scanning manner. In the passive scanning, an STA performing the scanning waits for a beam frame while moving between channels. The beacon frame is one of management frames in IEEE 802.11, and is transmitted periodically to report the existence of a wireless network and to allow the STA performing scanning to find the wireless network so as to join the wireless network. In the BSS, an AP serves to periodically transmit the beacon frame. In the IBSS, STAs in the IBSS transmit the beacon frame in turn. The STA performing scanning stores the BSS-related information included in the beacon frame while receiving the beacon frame, and records beacon frame information in each channel while moving to another channel. An STA which has received the beacon frame may store the BSS-related information included in the received beacon frame, and may move to a next channel to perform scanning in the next channel in the same manner.

Comparing the active scanning and the passive scanning, advantageously, the active scanning has less delay and power consumption than the passive scanning.

After the STA discovers the network, an authentication process may be performed in step S520. The authentication process may be referred to as a first authentication process in order to clearly distinguish from a security setup operation of step S540 described below.

The authentication process includes a process in which the STA transmits an authentication request frame to the AP, and the AP transmits an authentication response frame to the STA in response thereto. The authentication frame used in the authentication request/response corresponds to a management frame.

The authentication frame may include information on an authentication algorithm number, an authentication transaction sequence number, a status code, a challenge text, a robust security network (RSN), a finite cyclic group, or the like. This information corresponds to some examples of information which may be included in the authentication request/response frame, and may be replaced with different information, or additional information may be further included.

The STA may transmit the authentication request frame to the AP. The AP may determine whether to accept authentication for a corresponding STA on the basis of information included in the received authentication request frame. The AP may provide an authentication processing result to the STA through the authentication response frame.

After the STA is successfully authenticated, an association process may be performed in step S530. The association process includes a process in which the STA transmits an association request frame to the AP, and the AP transmits an association response frame to the STA in response thereto.

For example, the association request frame may include information related to various capabilities, a beacon listen interval, a service set identifier (SSID), supported rates, supported channels, RSN, a mobility domain, supported operating classes, a traffic indication map (TIM) broadcast request, an interworking service capability, or the like.

For example, the association response frame may include information related to various capabilities, a status code, an association ID (AID), supported rates, an enhanced distributed channel access (EDCA) parameter set, a received channel power indicator (RCPI), a received signal to noise indicator (RSNI), a mobility domain, a timeout interval (association comeback time), an overlapping BBS scan parameter, a TIM broadcast request, a QoS map, or the like.

This information corresponds to some examples of information which may be included in the association request/response frame, and may be replaced with different information, or additional information may be further included.

After the STA is successfully associated with the network, a security setup process may be performed in step S540. The security setup process of step S540 may be referred to as an authentication process through a robust security network association (RSNA) request/response. The authentication process of step S520 may be referred to as a first authentication process. The security setup process of step S540 may be simply referred to as an authentication process.

The security setup process of step S540 may include a private key setup process through 4-way handshaking by using, for example, an extensible authentication protocol over LAN (EAPOL) frame. In addition, the security setup process may be performed according to a security scheme not defined in the IEEE 802.11 standard.

Medium Access Mechanism

In a WLAN system based on IEEE 802.11, a basic access mechanism of a medium access control (MAC) is a carrier sense multiple access with collision avoidance (CSMA/CA) mechanism. The CSMA/CA mechanism is also referred to as a distributed coordinate function (DCF) of the IEEE 802.11 MAC, and basically employs a "listen before talk" access mechanism. According to this type of access mechanism, an AP and/or an STA may perform clear channel assessment (CCA) which senses a medium or a wireless channel during a specific time duration (e.g., DCF inter-frame space (DIFS)) before starting transmission. As a result of sensing, if it is determined that the medium is in an idle status, frame transmission starts by using the medium. Otherwise, if it is sensed that the medium is in an occupied status, the AP and/or the STA does not start its transmission but sets and waits for a delay duration (e.g., a random backoff period) for medium access. By applying the random backoff period, it is expected that several STAs attempt to transmit a frame after waiting for different time durations, thereby minimizing a collision.

In addition, the IEEE 802.11 MAC protocol provides a hybrid coordination function (HCF). The HCF is based on the DCF and a point coordination function (PCF). The PCF is a polling-based synchronous access scheme in which polling is periodically performed so that all receiving APs and/or STAs can receive data frames. In addition, the HCF may have enhanced distributed channel access (EDCA) and HCF controlled channel access (HCCA). The EDCA is a contention based access scheme for providing a data frame to a plurality of users, and the HCCA is a contention-free based channel access scheme using a polling mechanism. In addition, the HCF may include a medium access mechanism for improving a quality of service (QoS) of the WLAN, and may transmit QoS data in both a contention period (CP) and a contention-free period (CFP).

Figure 4:
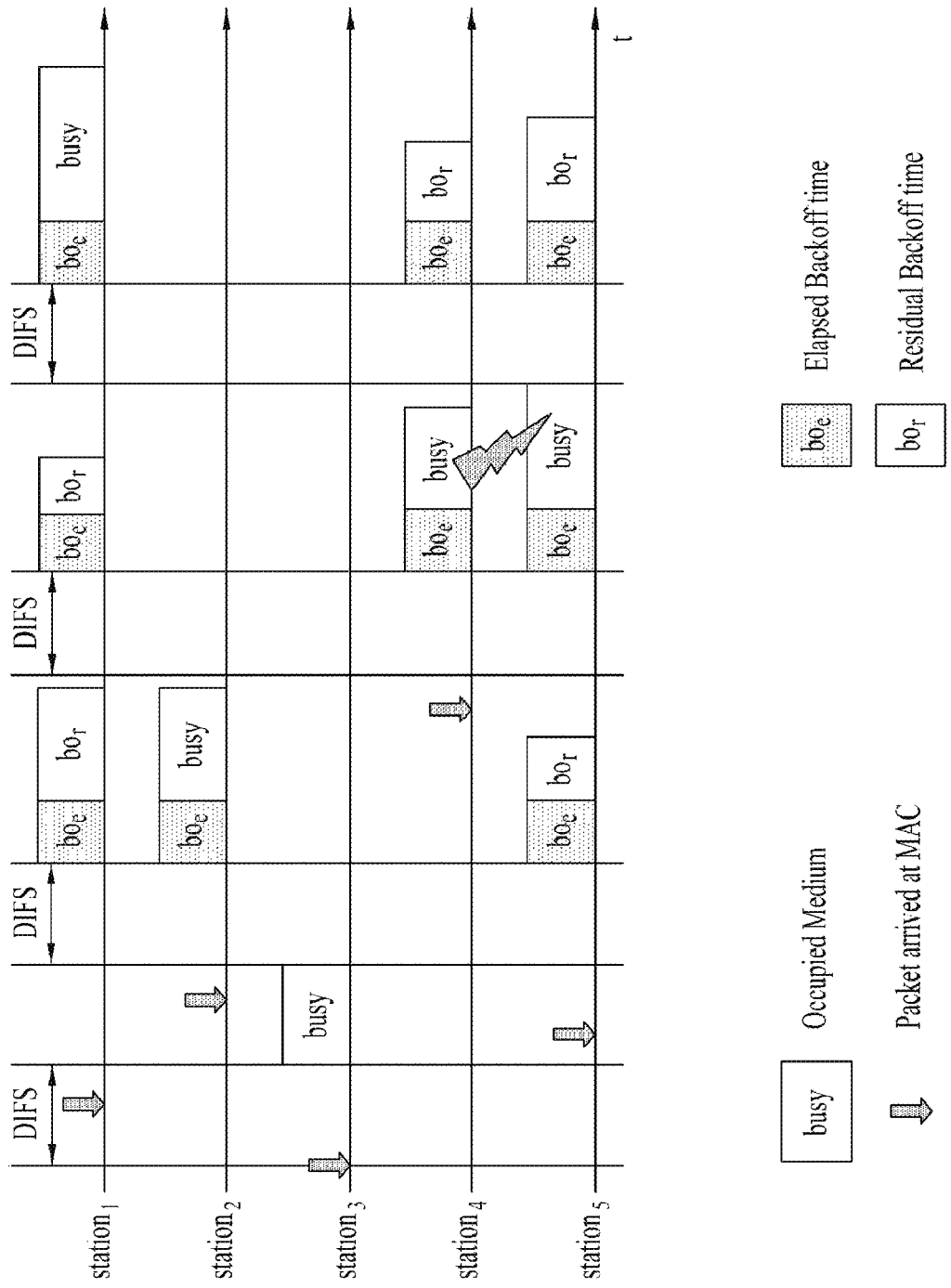
FIG. 4 is a drawing for explaining a backoff process.

FIG. 4 is a drawing for explaining a backoff process.

An operation based on a random backoff period will be described with reference to FIG. 4. When a specific medium is changed from an occupied (or busy) status to an idle status, several STAs may attempt data (or frame) transmission. In this case, as a method for minimizing a collision, each of the STAs may select a random backoff count and may attempt transmission after waiting for a corresponding time slot. The random backoff count may have a packer number value, and may be determined as one of values in the range of 0 to CW. Herein, the CW is a contention window parameter value. The CW parameter has an initial value given as CWmin, but may take a value two times higher than that if transmission fails (e.g., if ACK is not received for a transmitted frame). If the CW parameter value is CWmax, data transmission may be attempted while maintaining CWmax until data transmission is successful, and if data transmission is successful, the value is reset to CWmin. The values CW, CWmin, and CWmax are preferably set to $2^n-1$ (n=0, 1, 2, . . . ).

When the random backoff process starts, the STA continuously monitors a medium during counting down a backoff slot according to the determined backoff count value. When the medium is monitored in the busy status, the STA stops the countdown and waits. When the medium is monitored in the idle status, the STA resumes the countdown.

In the example of FIG. 4, upon arrival of a packet to be transmitted to MAC of an STA 3, the STA3 may transmit a frame immediately after identifying that the medium is idle for a time of DIFS. Meanwhile, the remaining STAs may monitor that the medium is in the busy status and may wait. In the meantime, data to be transmitted may be generated in each of STAs 1, 2, and 5. Each STA may wait for the DIFS when the medium is monitored in the idle status, and thereafter may count down a backoff slot according to a random backoff time selected by each STA. The example of FIG. 4 shows a case where the STA2 selects a shortest backoff time, and the STA1 selects a longest backoff count value. That is, it is shown that a residual backoff time of the STA5 is shorter than a residual backoff time of the STA1 at a time when the STA2 finishes backoff counting for the selected random backoff time and starts frame transmission. The STA1 and the STA5 stop the countdown and waits during the STA2 occupies a medium. When the medium occupancy of the STA2 is finished and thus the medium is in the idle status again, the STA1 and the STA5 resume the countdown for the residual backoff time which has stopped after waiting for the DIFS. That is, frame transmission may start after counting down the residual backoff slot corresponding to the residual backoff time. Since the STA5 has a shorter residual backoff time than the STA1, the STA5 starts frame transmission. Meanwhile, data to be transmitted may be generated also in the STA4 during the STA2 occupies the medium. In this case, the STA4 may wait for the DIFS when the medium is in the idle status, and thereafter may perform the countdown based on the random backoff count value selected by the STA4 and may start frame transmission. The example of FIG. 6 shows a case where the residual backoff time of the STA5 incidentally coincides with the random backoff time of the STA4. In this case, a collision may occur between the STA4 and the STA5. When the collision occurs, both the STA4 and the STA5 cannot receive ACK, which leads to a failure in data transmission. In this case, the STA4 and the STA5 may double a CW value and then select the random backoff count value, and may perform the countdown. Meanwhile, the STA1 may wait during a medium is in the busy state due to transmission of the STA4 and the STA5, and when the medium is in the idle status, may wait for DIFS and thereafter may transmit a frame at the expiry of the residual backoff time.

Sensing Operation of STA

As described above, a CSMA/CA mechanism includes virtual carrier sensing as well as physical carrier sensing in which an AP and/or an STA directly senses a medium. The virtual carrier sensing is intended to compensate for a problem which may occur on medium access such as a hidden node problem or the like. For the virtual carrier sensing, MAC of a WLAN system may use a network allocation vector (NAV). The NAV is a value used by an AP and/or STA, which is currently using a medium or has a right to use it, to indicate a remaining time until the medium is in an available state to another AP and/or STA. Therefore, the value which is set to the NAV corresponds to an interval scheduled to use the medium by an AP and/or STA for transmitting a corresponding frame, and an STA receiving the NAV value is prohibited from accessing the medium during the interval. The NAV may be set, for example, according to a value of a "duration" field of an MAC header of the frame.

In addition, a robust collision detection mechanism has been introduced to reduce the possibility of collision. This will be described with reference to FIG. 5 and FIG. 7. Although a carrier sensing range may not be actually identical to a transmission range, it is assumed that they are identical to each other for convenience of explanation.

FIG. 5 is a diagram for explaining a hidden node and an exposed node.

FIG. 5(a) is an example of a hidden node when an STA A communicates with an STA B, and an STA C has information to be transmitted. Specifically, although it is a situation where the STA A transmits information to the STA B, it may be determined that a medium is in an idle status when the STA C performs carrier sensing before transmitting data to the STA B. This is because transmission (e.g., medium occupancy) of the STA A may not be sensed at a location of the STA C. In this case, the STA B simultaneously receives information of the STA A and the STA C, which results in a collision. In this case, the STA A may be referred to as a hidden node of the STA C.

FIG. 5(b) is an example of an exposed node when an STA C has information to be transmitted from an STA D in a situation where and an STA B transmits data to an STA A. In this case, when the STA C performs carrier sensing, it may be determined as a state where a medium is occupied due to transmission of the STA B. Accordingly, even if the STA C has information to be transmitted to the STA D, since an occupied status of the medium is sensed, waiting is required until the medium becomes an idle status. However, since the STA A is actually out of a transmission range of the STA C, transmission from the STA C and transmission from the STA B may not collide with each other from a perspective of the STA A. Therefore, the STA C unnecessarily waits until the STA B stops transmission. In this case, the STA C may be referred to as an exposed node of the STA B.

FIG. 6 is a drawing for explaining RTS and CTS.

In order to efficiently utilize a collision avoidance mechanism in an exemplary situation of FIG. 5, a short signaling packet such as request to send (RTS) and clear to send (CTS) or the like may be utilized. The RTS/CTS between two STAs may allow overhearing of nearby STA(s), thereby allowing the nearby STA(s) to consider whether to transmit information between the two STAs. For example, when an STA intending to transmit data transmits an RTS frame to an STA for receiving data, the STA for receiving data may transmit the CTS frame to the nearby STAs to report that the STA will receive data.

FIG. 6(a) is an example of a method for solving a hidden node problem when both an STA A and an STA C intend to transmit data to an STA B. When the STA A sends RTS to the STA B, the STA B transmits CTS to both the STA A and STA C located around the STA B. As a result, the STA C waits until the STA A and the STA B stop data transmission, thereby avoiding a collision.

FIG. 6(b) is an example of a method of solving an exposed hidden problem. Since an STA C overhears RTS/CTS transmission between an STA A and an STA B, the STA C may determine that a collision will not occur even if the STA C transmits data to another STA (e.g., an STA D). That is, the STA B transmits RTS to all nearby STAs, and only the STA A having data to be actually transmitted transmits CTS. The STA C receives only the RTS and does not receive the CTS of the STA A, and thus can know that the STA A is located out of a carrier sensing range of the STA C.

Power Management

In the aforementioned WLAN system, an STA has to perform channel sensing before performing transmission/reception, which causes persistent power consumption of the STA. Power consumption in a reception state is not significantly different from power consumption in a transmission state, and maintaining the reception state persistently is a great burden to an STA with limited power (i.e., operating by a battery). Therefore, if the STA maintains a reception waiting state to persistently sense a channel, power may be inefficiently consumed without a special benefit in terms of a WLAN throughput. In order to solve such a problem, the WLAN system supports a power management (PM) mode of the STA.

The PM mode of the STA is divided into an active mode and a power save (PS) mode. The STA operates in the active mode by default. The STA operating in the active mode maintains an awake state. The awake state is a state where a normal operation such as frame transmission/reception, channel scanning, or the like is possible. Meanwhile, an STA operating in the PS mode operates while switching a sleep state (or doze state) and the awake state. The STA operating in the sleep state operates with minimum power, and does not perform channel scanning not to mention frame transmission/reception.

Power consumption decreases when the STA operates in the sleep state as long as possible, and thus an operating duration of the STA increases. However, since frame transmission/reception is impossible in the sleep state, it is not possible to operate unconditionally for long. In the presence of a frame to be transmitted to the AP by the STA operating in the sleep state, a frame may be transmitted by switching to the awake state. Meanwhile, in the presence of a frame to be transmitted to the STA by the AP, the STA in the sleep state cannot receive this and cannot know the presence of the frame to be received, either. Therefore, the STA may require an operation of switching to the awake state according to a specific period in order to know whether there is a frame to be transmitted to the STA (or in order to receive the frame in the presence of the frame).

The AP may transmit a beacon frame to the STAs in a BSS with a specific period. A traffic indication map (TIM) information element may be included in the beacon frame. The TIM information element may include information indicating that the AP has buffered traffic for STAs associated with the AP and will transmit the frame. An example of the TIM element includes a TIM used to report a unicast frame and a delivery traffic indication map (DTIM) used to report a multicast or broadcast frame.

Figure 7:
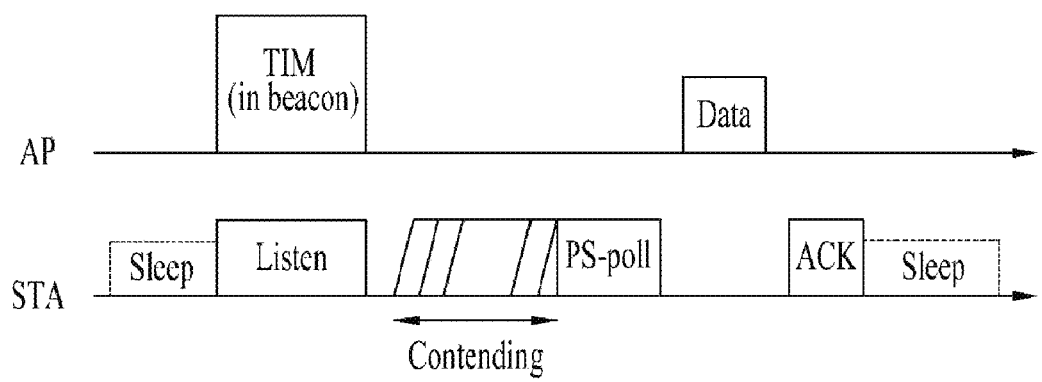
FIG. 7 to FIG. 9 are drawings for explaining in detail an operation of an STA which has received a TIM.
Figure 8:
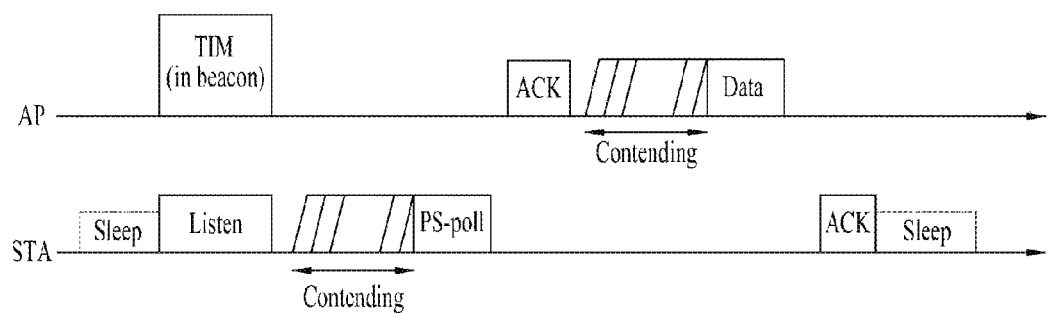
Figure 9:
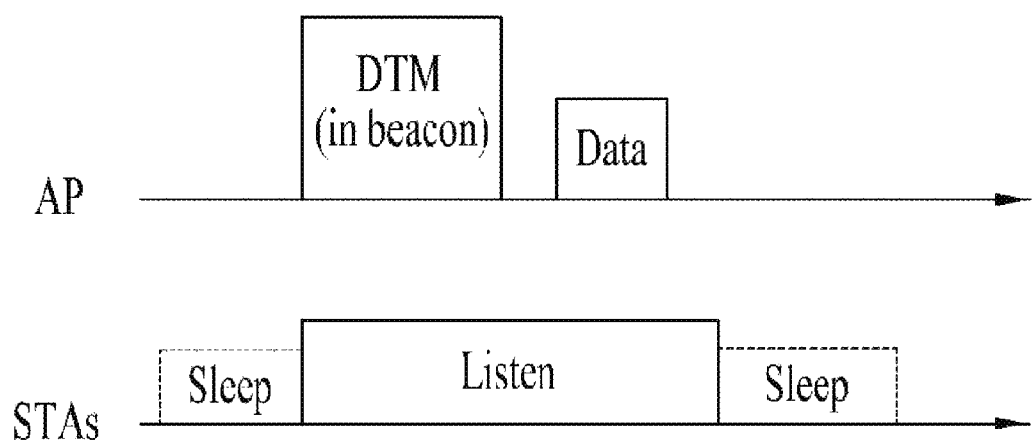

FIG. 7 to FIG. 9 are drawings for explaining in detail an operation of an STA which has received a TIM.

Referring to FIG. 7, in order to receive a beacon frame including a TIM from an AP, an STA may switch from a sleep state to an awake state, and may interpret a received TIM element to know that there is buffered traffic to be transmitted to the STA. After contending with other STAs to access a medium for PS-poll frame transmission, the STA may transmit a PS-poll frame to request the AP to transmit a data frame. The AP which has received the PS-poll frame transmitted by the STA may transmit the frame to the STA. The STA may receive a data frame and transmit an ACK frame for this to the AP. Thereafter, the STA may switch back to the sleep state.

As shown in FIG. 7, the AP may operate in an immediate response manner in which a data frame is transmitted after a specific time (e.g., short inter-frame space (SIFS)) from reception of a PS-poll frame from the STA. Meanwhile, if the AP fails to prepare a data frame to be transmitted to the STA during the SIFS time after reception of the PS-poll frame, the AP may operate in a deferred response manner, which will be described with reference to FIG. 8.

In the example of FIG. 8, an operation in which the STA switches from the sleep state to the awake state to receive a TIM from the AP and transmit a PS-poll frame to the AP through contention is the same as the example of FIG. 7. If the AP fails to prepare the data frame during the SIFS even if the PS-poll frame is received, an ACK frame may be transmitted to the STA instead of transmitting a data frame. When the data frame is prepared after transmitting the ACK frame, the AP may transmit a data frame to the STA after performing contending. The STA may transmit the ACK frame to the AP to indicate that the data frame is successfully received, and then may switch to the sleep state.

FIG. 9 shows an example in which an AP transmits a DTIM. STAs may switch from a sleep state to an awake state to receive a beacon frame including a DTIM element from the AP. Through the received DTIM, the STAs may know that a multicast/broadcast frame will be transmitted. The AP may transmit data (i.e., multicast/broadcast frame) directly without an operation of transmitting/receiving a PS-poll frame after transmitting the beacon frame including the DTIM. The STAs may receive data while maintaining the awake state persistently after reception of the beacon frame including the DTIM, and may switch back to the sleep state after data reception is complete.

General Frame Structure

Figure 10:
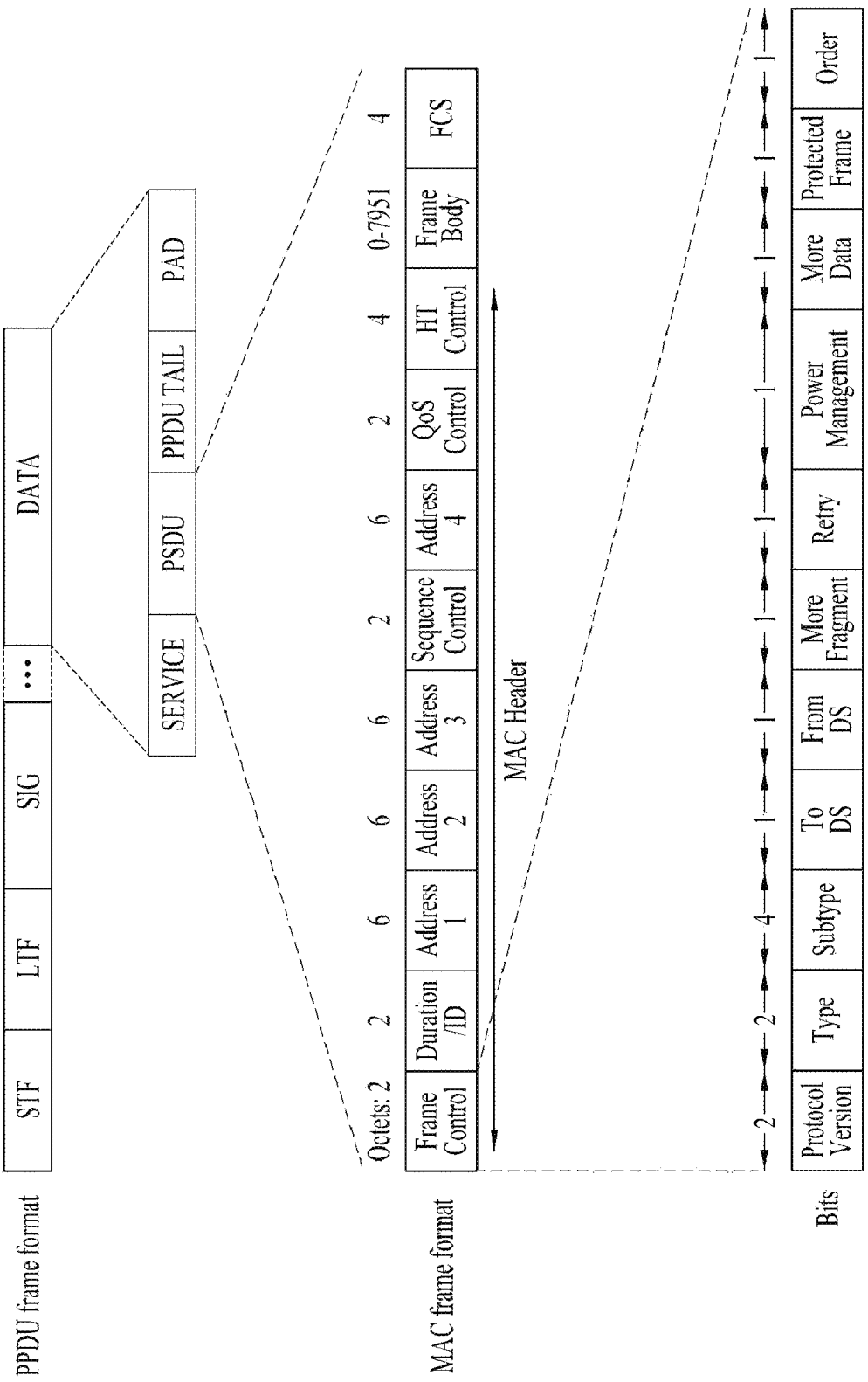
FIG. 10 is a drawing for explaining an example of a frame structure used in an IEEE 802.11 system.

FIG. 10 is a drawing for explaining an example of a frame structure used in an IEEE 802.11 system.

A physical layer protocol data unit (PPDU) frame format may include a short training field (STF), a long training field (LTF), a signal (SIG) field, and a data field. The most basic (e.g., non-high throughput (HT)) PPDU frame format may include only a legacy-STF (L-STF), a legacy-LTF (L-LTF), an SIG field, and a data field.

The STF is a signal for signal detection, automatic gain control (AGC), diversity selection, precise time synchronization, or the like, and the LTF is a signal for channel estimation, frequency error estimation, or the like. The STF and the LTF may be collectively referred to as a PLCP preamble, and the PLCP preamble may be a signal for channel estimation and synchronization of an OFDM physical layer.

The SIG field may include a rate field and a length field or the like. The rate field may include information on a data modulation and coding rate. The length field may include information on a data length. In addition, the SIG field may include a parity bit, an SIG tail bit, or the like.

The data field may include a service field, a physical layer service data unit (PSDU), and a PPDU tail bit, and optionally may include a padding bit. Some bits of the service field may be used for synchronization of a descrambler at a receiving end. The PSDU may include data generated/used in a higher layer, in association with a MAC protocol data unit (MPDU) defined in a MAC layer. The PPDU tail bit may be used to return an encoder to a zero state. The padding bit may be used to adjust a length of the data field to a specific unit.

The MPDU is defined according to various MAC frame formats, and a basic MAC frame consists of a MAC header, a frame body, and a frame check sequence (FCS). The MAC frame may be constructed of an MPDU and may be transmitted/received through a PSDU of a data part of a PPDU frame format.

The MAC header includes a frame control field, a duration/ID field, an address field, or the like. The frame control field may include control information required for frame transmission/reception. The duration/ID field may be set to a time for transmitting a corresponding frame or the like.

The duration/ID field included in the MAC header may be set to a 16-bit length (e.g., B0~B15). Content included in the duration/ID field may vary depending on a frame type and a sub type, whether it is transmitted during a contention free period (CFP), QoS capability of a transmitting STA, or the like. In a control frame of which a sub type is PS-poll, the duration/ID field may include an AID of a transmitting STA (e.g., through 14 LSB bits), and 2 MSB bits may be set to 1. (ii) In frames transmitted during a CFP by a point coordinator (PC) or a non-QoS STA, the duration/ID field may be set to a fixed value (e.g., 32768). (iii) In addition thereto, in other frames transmitted by the non-QoS STA or control frames transmitted by the QoS STA, the duration/ID field may include a duration value defined for each frame type. In a data frame or management frame transmitted by the QoS STA, the duration/ID field may include a duration value defined for each frame type. For example, if the duration/ID field is set to B15=0, it indicates that the duration/ID field is used to indicate a TXOP duration, and B0~B14 may be used to indicate an actual TXOP duration. The actual TXOP duration indicated by the B0~B14 may be any one of 0~32767, and a unit thereof may be a microsecond (us). However, if the duration/ID field indicates a fixed TXOP duration value (e.g., 32768), it may be set to B15=1 and B0~B14=0. In addition thereto, if it is set to B14=1 and B15=1, the duration/ID field is used to indicate an AID, and B0~B13 indicate one AID in the range of 1-2007. Details of Sequence Control, QoS Control, and HT Control subfields of a MAC header may refer to the IEEE 802.11 standard document.

A frame control field of the MAC header may include Protocol Version, Type, Subtype, To DS, From DS, More Fragment, Retry, Power Management, More Data, Protected Frame, and Order subfields. Details of each subfield of the frame control field may refer to the IEEE 802.11 standard document.

VHT Beamforming

Next, SU(single user)-MIMO(multi-input multi-output) and DL-MU(downlink multi-user)-MIMO beamforming in a VHT(very high throughput) (e.g., IEEE 802.11ac) WLAN system will be described.

SU-MIMO and DL-MU-MIMO beamforming may be used to improve a throughput in an STA having multiple antennas (e.g., beamformer) for steering a signal by using channel information. In case of the SU-MIMO beamforming, all time-space streams in a transmitted signal are for reception in a single STA. In case of the DL-MU-MIMO beamforming, disjoint sub-sets of the time-space streams may be for reception of different STAs.

In the SU-MIMO beamforming, a steering matrix is determined by a beamformer. Specifically, the beamformer may determine the steering matrix from a beamforming feedback matrix received from a beamformee in a format of a compressed beamforming feedback matrix. The beamformee may report the compressed beamforming feedback matrix through a VHT compressed beamforming frame.

The VHT compressed beamforming frame corresponds to an Action No Ack frame. An Action field of the VHT compressed beamforming frame may include at least one of a category field, a VHT Action field, a VHT MIMO control field, a VHT compressed beamforming report field, and an MU Exclusive beamforming report field.

FIG. 11 shows a VHT MIMO control field of a VHT compressed beamforming frame. The VHT MIMO control field may be included in all VHT compressed beamforming frames. Referring to FIG. 11, the VHT MIMO control field may include at least one of an Nc index subfield, an Nr index subfield, a channel width subfield, a grouping subfield, a codebook information subfield, a feedback type subfield, a remaining feedback segments subfield, a first feedback segment subfield, a reserved subfield, and a sounding dialog token number subfield.

The Nc index subfield indicates −1 as the number of columns of the compressed beamforming feedback matrix. For example, if the number of columns of the compressed beamforming feedback matrix is 1, the Nc index subfield is set to 0. The Nr index subfield indicates −1 as the number of rows of the compressed beamforming feedback matrix. The channel width subfield indicates a width of a channel measured to generate the compressed beamforming feedback matrix. The grouping subfield indicates subcarrier grouping Ng used for the compressed beamforming feedback matrix. The codebook information subfield indicates a size of a codebook entry. The feedback type indicates SU/MU. The remaining feedback segments subfield indicates the number of feedback segments remaining in association with the VHT compressed beamforming frame. The first feedback segment subfield indicates whether a corresponding feedback segment corresponds to a first feedback of a segmented report. The sounding dialog token number subfield indicates a sounding dialog token from a VHT NDP announcement frame in which a feedback is requested.

As explicit feedback information, the VHT compressed beamforming report field of the VHT compressed beamforming frame may correspond to angles expressing the compressed beamforming feedback matrix, and may be used to determine when a transmitting beamformer determines a steering matrix. A size of the VHT compressed beamforming report field may vary depending on a value of the VHT MIMO control field. The VHT compressed beamforming report field may include (segmented) VHT compressed beamforming report information. An STA which has a 40 MHz, 80 MHz, or 160 MHz operating channel width and transmits a feedback for a 20 MHz channel width may allow only a subcarrier corresponding to a primary 20 MHz channel to be included the compressed feedback beamforming matrix subfield. An STA which has an 80 MHz or 160 MHz operating channel width and transmits a feedback for a 40 MHz channel width may allow a subcarrier corresponding to a primary 40 MHz channel to be included in the compressed feedback beamforming matrix subfield. An STA which has a 160 MHz or 80+80 MHz operating channel width and transmits a feedback for an 80 MHz channel width may allow a subcarrier corresponding to a primary 80 MHz channel into the compressed feedback beamforming matrix subfield.

VHT Sounding Protocol

As described above, information on a channel are required in transmission beamforming and DL MU-MIMO state to calculate a steering matrix. The steering matrix is applied to a transmission signal to optimize reception in one or more receivers. An STA which transmits a signal by applying the steering matrix is a beamformer, and an STA which receives the signal is a beamformee. In addition, as described above, the beamformee transmits explicit feedback information to the beamformer by measuring a channel through training symbols transmitted from the beamformer.

The beamformer may transmit a NDP-A(null data packet announcement) frame, and may initiate a sounding procedure by transmitting an NDP frame after SIFS. The NDP frame represents a PPDU not having a data field.

The beamformer allows one STA information field to be included in the NDP-A frame for each beamformee which will perform the compressed beamforming feedback. The STA information field includes an AID subfield for identifying the beamformee.

Figure 12:
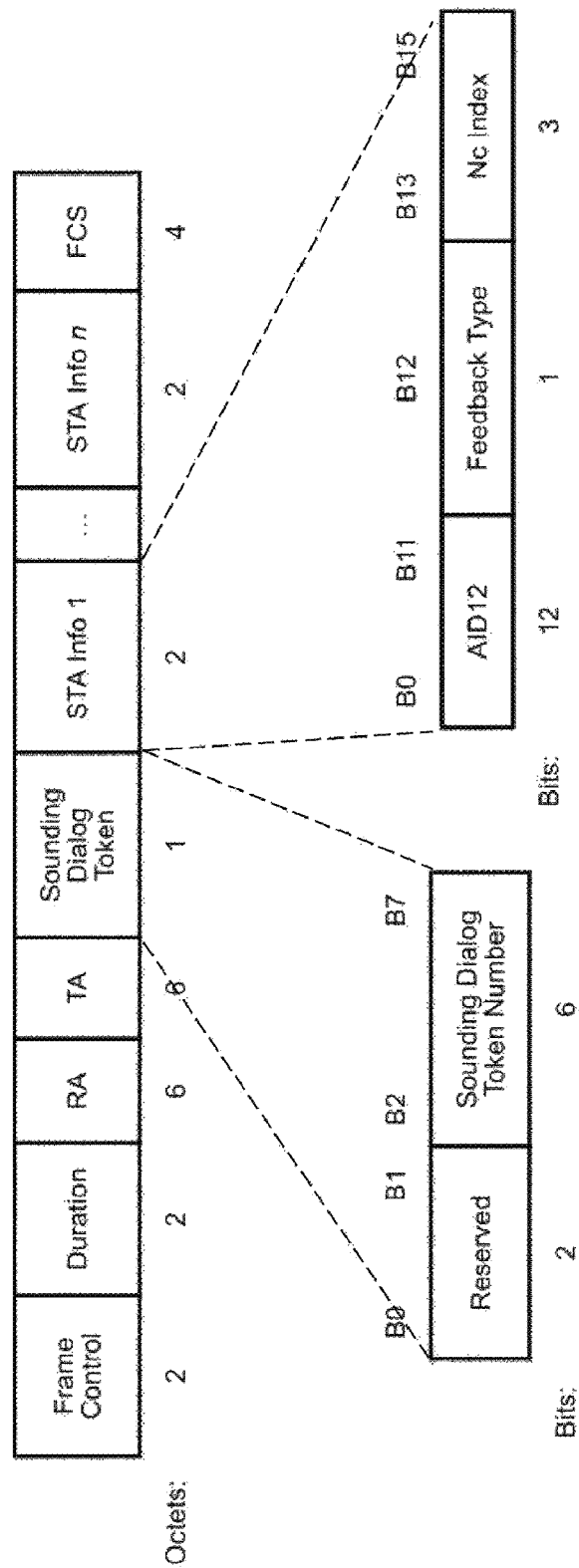
FIG. 12 shows a VHT NDP-A frame.

FIG. 12 shows a VHT NDP-A frame.

Referring to FIG. 12, the NDP-A frame includes a frame control (FC) field, a duration field, an RA field, a TA field, a sounding dialog token field, at least one STA information field, and an FCS field.

The FC field, duration field, RA field, and TA field of the NDP-A frame may be set similarly to the aforementioned FC field, duration field, RA field, and TA field of the MAC header of FIG. 10.

If a plurality of STA information fields are included in the NDP-A frame, the RA of the NDP-A frame is set to a broadcast address. Unlike this, if only one STA information field is included in the NDP-A frame, the RA is set to a MAC address of a corresponding beamformee.

The TA field is set to an address of an STA for transmitting the NDP-A frame or set to a BW signaling TA of the STA for transmitting the NDP-A frame.

The sounding dialog token field includes a reserved subfield and a sounding dialog token subfield. The sounding dialog token subfield includes a value selected by a beamformer to identify the NDP-A frame.

The STA information field includes an AID12 subfield, a feedback type subfield, and an Nc index subfield. The AID12 subfield includes LSB 12 bits of an STA for performing a sounding feedback by receiving NDP. The feedback type subfield indicates whether a requested feedback type is SU or MU. If the feedback type is SU, the Nc index subfield corresponds to "Reserved". If the feedback type is MU, the Nc index subfield is set to −1 as the number of columns of the compressed beamforming feedback matrix.

If the plurality of STA information fields are included in the NDP-A frame, the beamformer may transmit a beamforming report poll frame to acquire a compressed beamforming feedback from an intended beamformee within TXOP.

The beamformee which has received the NDP-A frame receives the NDP frame after the SIFS. The beamformee receives the NDP frame, and transmits a PPDU including the compressed beamforming feedback after the SIFS.

Figure 13:
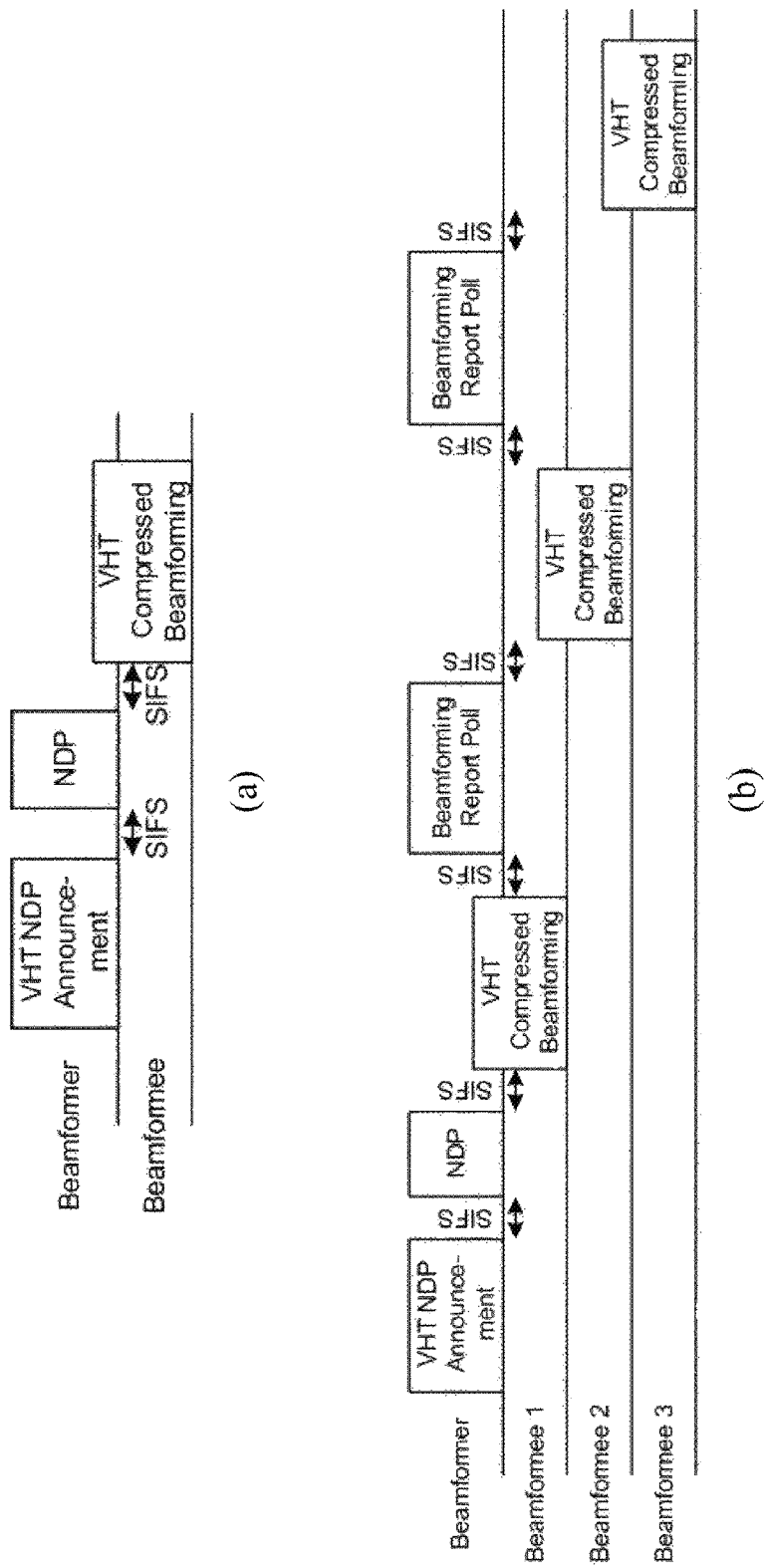
FIG. 13 shows a sounding procedure.

FIG. 13(*a*) shows a sounding procedure when there is one beamformee, and FIG. 13(*b*) shows a sounding procedure when there are a plurality of beamformees.

Feedback Scheme for Joint Transmission of Multiple APs

Hereinafter, a feedback procedure required to transmit a signal to an STA more efficiently is described in a WLAN environment where a plurality of APs are present. For example, the plurality of APs may perform joint transmission (JT) to the STA on the basis of a feedback from the STA. A method of channel measurement between the STA and each AP and a channel measurement result feedback method will be described for joint transmission of the plurality of APs.

According to an embodiment of the present invention, one of APs for performing the JT may be a master AP, and the remaining APs may operate as a slave AP. The master AP may control the JT. The master AP and the slave AP may be connected to each other through a wired network or may be connected through a wireless network. In the following examples, for convenience, it is assumed that the master AP and the slave AP are connected to each other through the wired network.

For example, the channel measurement and feedback required by the multiple APs to perform JT may be performed based on NDP frame transmission, for example, a sounding protocol.

An index given in the following examples is given for convenience of explanation, and examples of having different indices do not necessarily constitute an independent invention. Thus, examples of having different indices may be mutually combined within a range in which the indices do conflict with each other, thereby be implemented as one invention.

Example 1

For example, JT may be controlled by a master AP. In this case, in an NDP transmission procedure for channel measurement, only the master AP transmits NDP-A, and all APs may simultaneously transmit NDP after SIFS.

Synchronization between APs for performing JT may be adjusted in advance through a wired network, and an NDP transmission time and NDP-A information may also be transmitted through the wired network.

For example, the NDP-A transmitted by the master AP may include at least one of fields shown in Table 1.

TABLE 1

| Field | Information |
|---|---|
| STA Info Field | STA ID, Rx Field |
| Joint Transmission Indication Field | Inidicate whether it is measurement and feedback procedure for JT |
| Feedback Info Field | Ng, Nc |
| Antenna Configuration | The number of Tx antennas of all APs In JT. The STA may recognize multi-antenna transmission instead of recognizing multiple APs. |
| Number of Spatial Streams | The number of spatial streams for JT |

Figure 14:
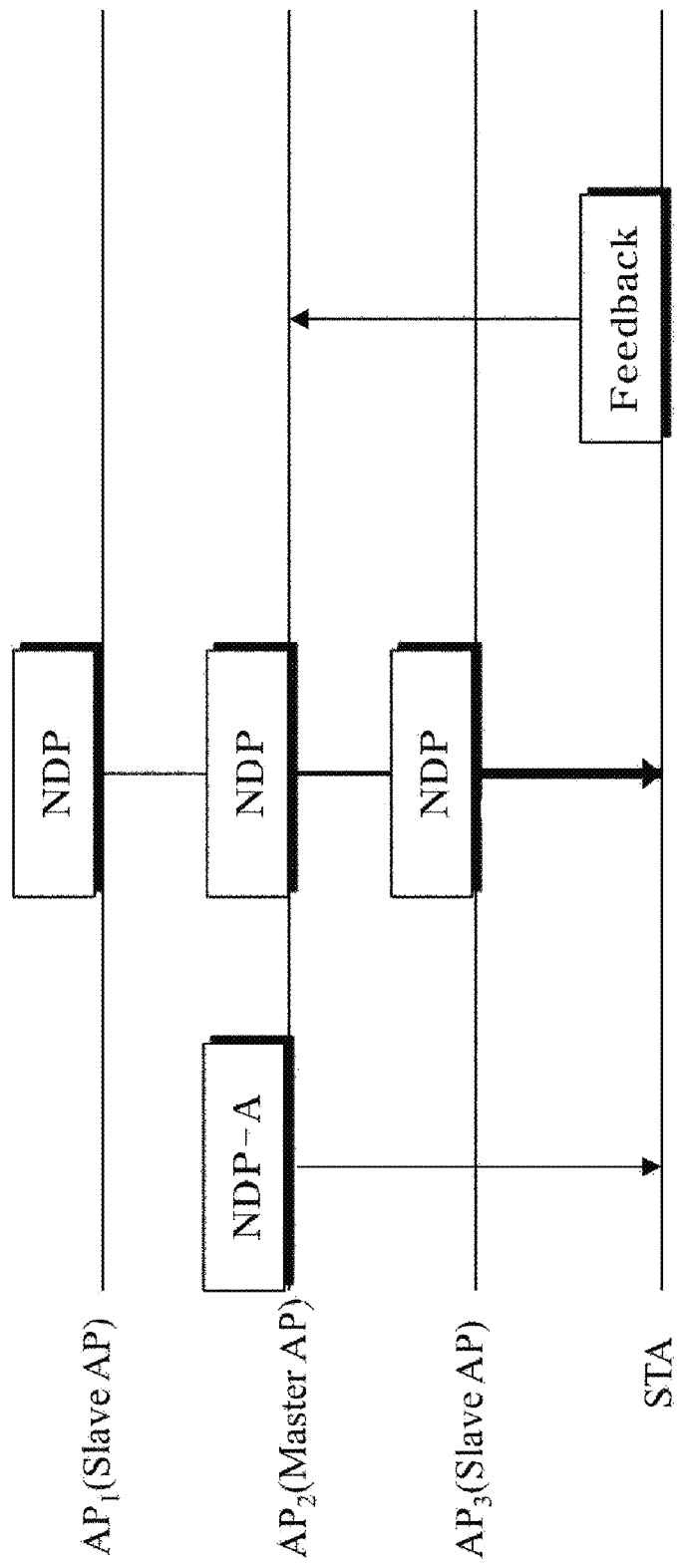
FIG. 14 shows a measurement and feedback procedure for JT according to an embodiment of the present invention.

FIG. 14 shows a measurement and feedback procedure for JT according to an embodiment of the present invention.

Referring to FIG. 14, an STA which has received NDP-A transmitted by a master AP may know that NDP will be transmitted from a plurality of APs through a joint transmission indication field. In addition, the STA may also know how many antennas will be used to perform JT through an antenna configuration field.

After SIFS from NDP-A transmission performed by the master AP, the master AP and slave AP(s) simultaneously transmit the same NDP to the STA.

An STA which has received the NDP from the plurality of APs feeds back channel information estimated through the NDP to the master AP after the SIFS from NDP reception.

The master AP which has received the feedback information of the STA may determine a transmission parameter, e.g., a beamforming matrix, for JP by using the feedback information, and may report it to a slave AP. In this case, in order to reduce an overhead of signal transmission between the master AP and the slave AP, the master AP may transmit only information on a channel between the slave AP and the STA other than information of all channels. For example, the master AP may provide a slave AP 1 with channel information between the slave AP 1 and the STA, and the master AP may provide a slave AP 2 with channel information between the slave AP 2 and the STA. However, the present invention is not limited thereto, and thus the master AP may equally provide all slave APs with the entire channel information.

In addition, unlike in the example in which only the master AP transmits the NDP-A, all APs performing JT may simultaneously transmit the same NDP-A.

Example 2

For example, NDP-A for sounding may be transmitted by a master AP, and NDP for channel estimation may be sequentially transmitted by each AP with an interval of SIFS after transmission of the NDP-A. In this case, sequential NDP transmission may be initiated by the master AP, and an NDP transmission order between slave APs may be determined by the mater AP and may be signaled through a wired network.

Since multiple APs transmit the NDP by using each time slot, the NDP-A transmitted by the master AP to report to the STA that a plurality of NDP frames are transmitted may include at least one of fields shown in Table 2.

TABLE 2

| Field | Information |
|---|---|
| STA Info Field | STA ID, Rx Field |
| Joint Transmission Indication Field | Indicate whether it is measurement and feedback procedure for JT |
| Feedback Info Field | Ng, Nc |
| Antenna Configuration | The number of Tx antennas for each AP (Each AP may have a different ant configuration.) |
| Number of Spatial Streams | The number of spatial streams for each AP |
| Number of NDP | The number of NDP frams transmitted consecutively |

Meanwhile, when a 3$^{rd}$ party STA receives an NDP-A frame, the number of NDP frames to be transmitted continuously may be recognized through the Number of NDP field, and a network allocation vector (NAV) may be configured based thereon.

Figure 15:
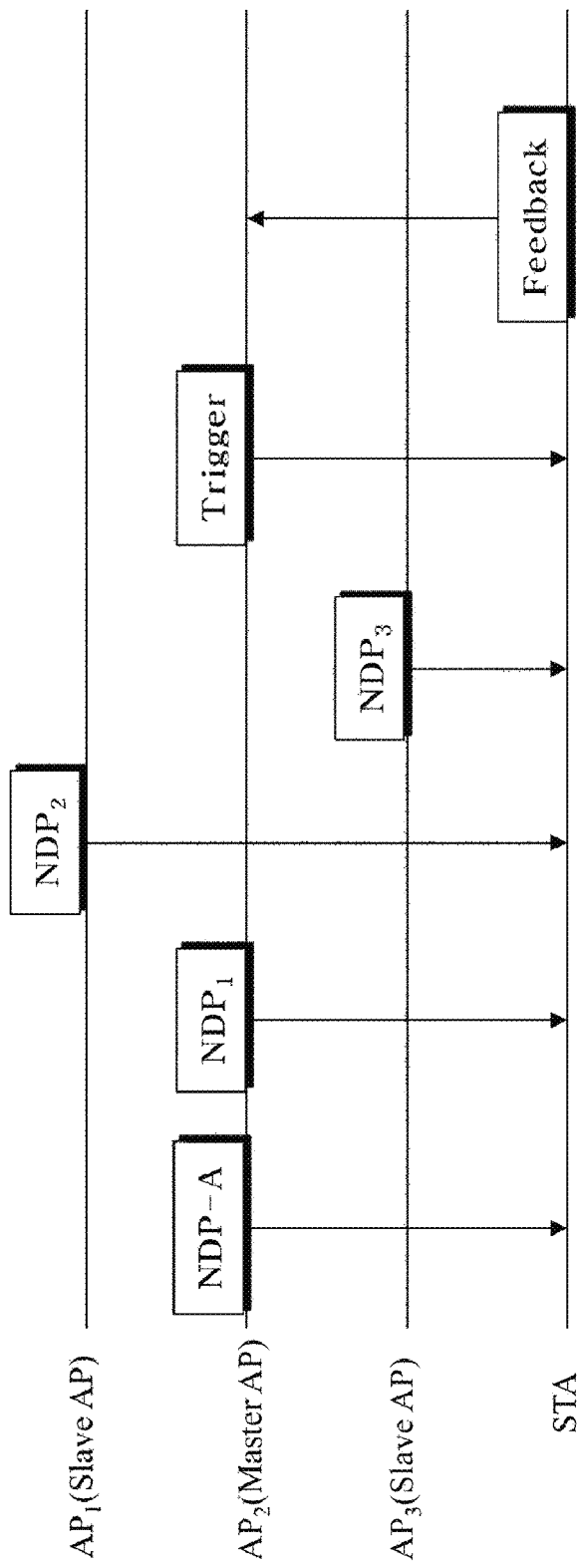
FIG. 15 shows a measurement and feedback procedure for JT according to another embodiment of the present invention.

FIG. 15 shows a measurement and feedback procedure for JT according to another embodiment of the present invention.

Referring to FIG. 15, after a master AP transmits NDP-A, each AP transmits NDP with an interval of SIFS. For example, after NDP 1 is transmitted, NDP 2 is transmitted without Ack transmission of the STA. In other words, the STA expects to receive the NDP 2 instead of transmitting Ack after receiving the NDP 1.

After last NDP transmission, the master AP transmits a trigger frame to the STA in order to receive channel information measured by the STA. For example, the trigger frame may be transmitted after SIFS from the last NDP transmission. Through the trigger frame reception, the STA may know the end of the NDP frame transmission.

In addition, in order to report to the STA the end of the NDP transmission, an indication reporting the end of sounding transmission may be included in the last NDP frame. Accordingly, the STA can be prevented from waiting for additional NDP transmission until the trigger frame is received.

The STA, which has received the trigger frame requesting a feedback after the end of the last NDP frame transmission, transmits to the master AP the channel information estimated through NDP received from each AP. For example, the STA may feed back to the master AP the channel information by using a resource allocated through the trigger frame.

For example, channel information may be fed back by using 26/52/106/242 RU tones defined for OFDMA transmission in 11 ax. In addition, different RU tones may be used to transmit channel information for each AP.

The master AP which has received the channel information may transmit the feedback information to each AP or may transmit only information corresponding to a corresponding AP, for example, information on a corresponding stream or antenna among the received feedback information.

For another example, instead of transmitting channel information for all APs at once through the trigger frame, the STA may feed back the channel information to a corresponding AP after SIFS from NDP reception of each AP. In this case, NDP-A may be transmitted only by the master AP. After NDP transmission, each AP may transmit channel information received from the STA, by using a wired network. The master AP which has received the channel information from each AP may perform JT by using the channel information.

For another example, each AP may transmit data to the STA by separately using corresponding channel information in JT, instead of transmitting to the master AP the channel information received from the STA.

Example 3

For example, each of a plurality of APs may transmit NDP-A and NDP for sounding. NDP-A/NDP transmission of each AP may be performed with an interval of SIFS.

In order to identify NDP sequentially transmitted by the plurality of APs, NDP-A transmitted by each AP may include information on a transmission order. For example, the NDP-A may include at least one of fields shown in Table 3.

TABLE 3

| Field | Information |
|---|---|
| STA Info Field | STA ID, Rx Field |
| Joint Transmission Indication Field | Inidicate whether it is measurement and feedback procedure for JT |
| Feedback Info Field | Ng, Nc |
| Antenna Configuration | The number of Tx antennas for each AP (Each AP may have a different ant configuration.) |

TABLE 3-continued

| Field | Information |
|---|---|
| Number of Spatial Streams | The number of spatial streams for each AP |
| Order of NDP transmission | NDP transmission order of each AP |
| Number of NDP | The number of NDP frams transmitted |
| End of NDP transmission | whehther it is last NDP frame transmission |

Meanwhile, an NDP transmission order of each AP may be determined based on BSS Color, or may be determined according to a paring order for JT.

Figure 16:
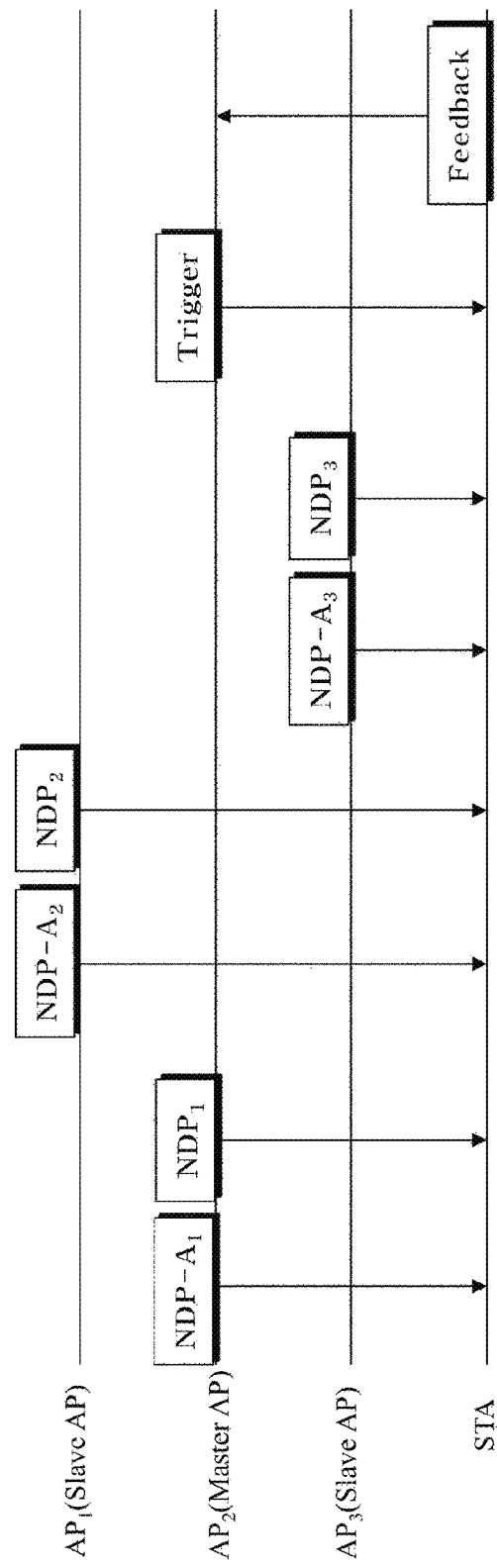
FIG. 16 shows a measurement and feedback procedure for JT according to another embodiment of the present invention.

FIG. 16 shows a measurement and feedback procedure for JT according to another embodiment of the present invention.

Referring to FIG. 16, since NDP-A is transmitted before each NDP transmission, disadvantageously, there is an increase in latency and overhead of sounding for JT. However, since the NDP-A is transmitted separately for each AP, an STA may estimate a channel more accurately according to a situation of the AP.

The STA may know that a corresponding NDP-A is for JT sounding through a joint transmission indication field of the NDP-A. Therefore, the STA may wait for next NDP-A/NDP reception instead of transmitting a feedback immediately after SIFS from NDP reception. Information reporting the end of NDP transmission may be included in a last NDP-A/NDP frame, and thus the STA may no longer have to wait for NDP-A/NDP for channel estimation.

A master AP may receive a feedback by transmitting a trigger frame to the STA after SIFS from the last NDP. For example, the STA may feed back channel estimation information between each AP and the STA, which is estimated through continuous NDP-A/NDP transmissions, to the master AP by using a resource allocated through the trigger frame.

Example 4

Figure 17:
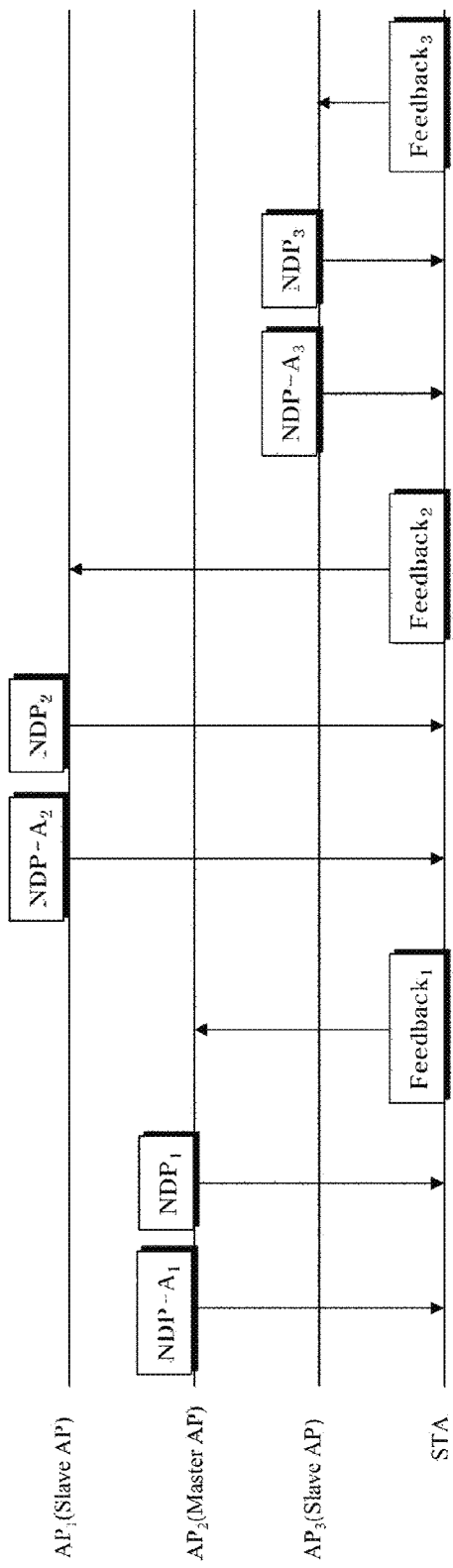
FIG. 17 shows a measurement and feedback procedure for JT according to another embodiment of the present invention.

FIG. 17 shows a measurement and feedback procedure for JT according to another embodiment of the present invention.

Each of a plurality of APs performing JT may acquire channel information between the AP and the STA by performing a sounding procedure separately with respect to the STA.

In order to prevent a $3^{rd}$ party STA from accessing a channel in the middle of a series of sounding procedures performed by the plurality of APs, TXOP information for a plurality of sounding procedures may be included in NDP-A transmitted by the master AP. In addition, TXOP information which covers the current sounding procedure and the remaining sounding procedure scheduled to be performed next may be included in NDP-A transmitted by other APs.

An STA which has received the NDP transmitted by each AP feeds back channel information to a corresponding AP immediately after SIFS. A next AP transmits the NDP-A/NDP for channel measurement after the SIFS from the feedback of the STA.

Since the channel information is acquired separately between each AP and the STA through the sounding procedure, disadvantageously, there is an increase in latency and overhead. Advantageously, however, information on a channel can be accurately acquired, and overhead caused by a feedback performed one time is not great since information to be transmitted is small in size in the one-time feedback.

Since the series of sounding procedures for JT is performed within TXOP determined by the master AP, the NDP-A/NDP transmitted by each AP and a feedback frame transmitted by the STA may be transmitted without contention for channel access.

Figure 18:
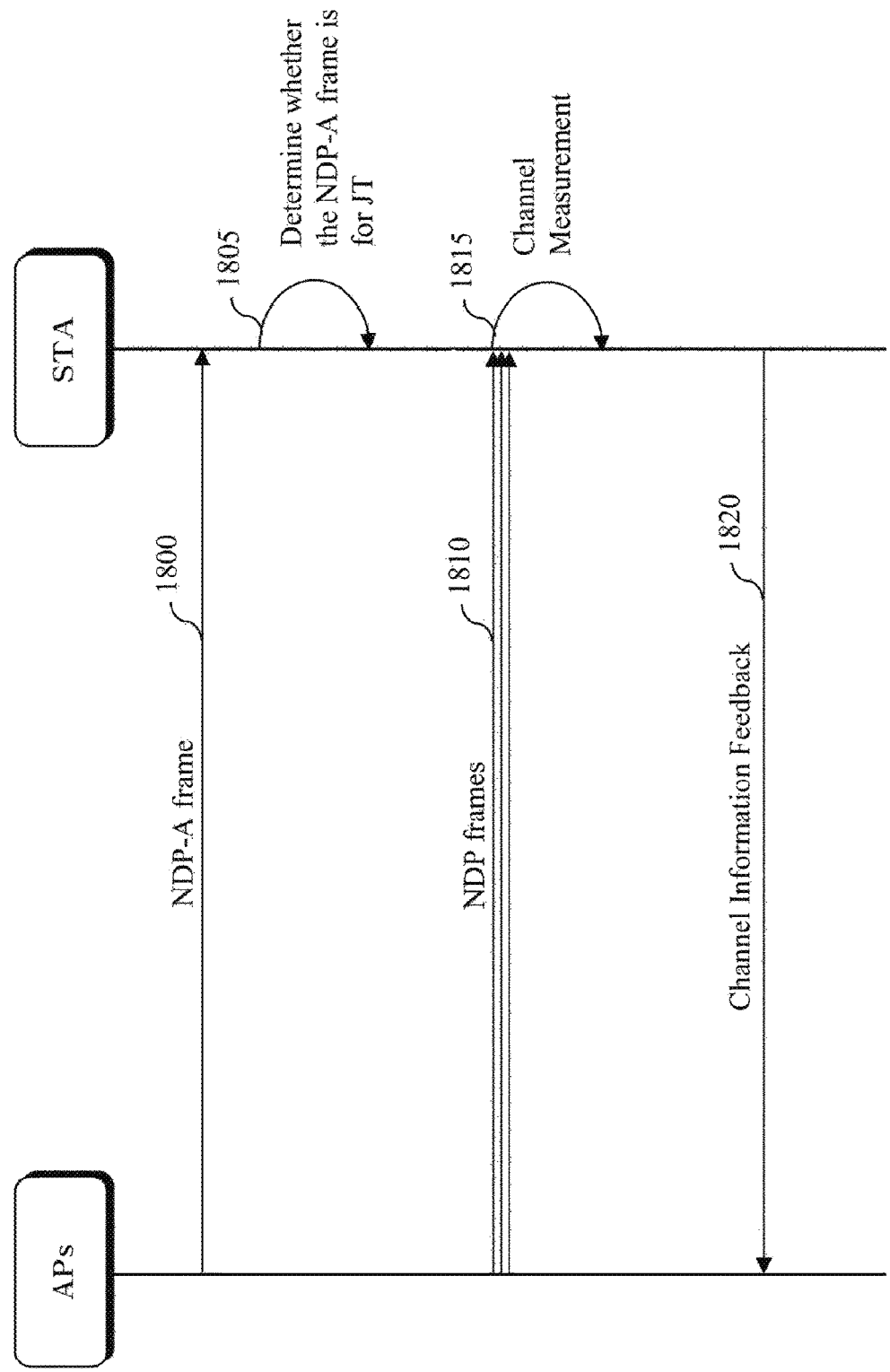
FIG. 18 shows a channel measurement and feedback method for JT according to an embodiment of the present invention.

FIG. 18 shows a channel measurement and feedback method for JT according to an embodiment of the present invention. The same description as described above can be omitted.

Although a plurality of APs are not distinctively illustrated in FIG. 18 for convenience, the plurality of APs may include a first AP and at least one second AP. The first AP may be a master AP, and each of the at least one second AP may be a slave AP. Which AP will be used to perform each AP operation of FIG. 18 can be clearly understood by those skilled in the art according to the aforementioned embodiments.

Referring to FIG. 18, the STA receives a null data packet announcement (NDP-A) frame (1800). The NDP-A frame may include at least one of an STA information field including an identifier of the STA, a joint transmission indicator including information on whether the NDP-A frame is for the joint transmission (JT) of the plurality of APs, an antenna configuration field, and a number of spatial streams.

The STA determines whether the received NDP-A frame is for JT of the plurality of APs (1815). For example, the STA may determine whether the NDP-A frame is for JT through a joint transmission indicator included in the NDP-A frame.

If the received NDP-A frame is not for JT, the STA may expect that the NDP frame will be transmitted only from a first AP. Otherwise, if the received NDP-A frame is for JT, the STA may expect that not only the first AP but also a second AP will transmit the NDP frame.

It is assumed hereinafter that the received NDP-A frame is for JT.

If the NDP-A frame is for JT, the STA measures a channel for the first AP which has transmitted the NDP-A frame and a channel for at least one second AP channel which has not transmitted the NDP-A frame (1815). For example, after receiving the NDP-A frame one time (1800), the STA may acquire the channel information for the plurality of APs through a plurality of NDP frames received from the plurality of APs (1810).

The STA transmits channel information for the plurality of APs, acquired as a result of channel measurement, to a first AP (1820).

For example, the STA may receive the plurality of NDP frames simultaneously from the plurality of APs after short inter-frame space (SIFS) from the NDP-A reception. The antenna configuration field of the NDP-A frame may include the number of transmission antennas for all of the plurality of APs. The number of spatial streams of the NDP-A frame may indicate/include the number of spatial streams for all of the plurality of APs.

As another example, the STA may receive the plurality of NDP frames sequentially from the plurality of APs according to/based on a specific IFS interval after SIFS from the NDP-A reception. An antenna configuration field of the NDP-A frame may include the number of transmission antennas for each AP. The number of spatial streams of the NDP-A frame may indicate/include the number of spatial streams for each AP. In addition, the NDP-A frame may further include information on the total number of the plurality of NDP frames.

The STA may receive a trigger frame from the first AP after receiving the plurality of NDP frames. Channel information on the plurality of APs may be transmitted through a resource allocated through the trigger frame.

26/52/106/242 RU tones defined in 11 ax may be used as the allocated resource.

A last NDP frame of the plurality of NDP frames may include an indicator indicating/for the end of NDP frame transmission.

Figure 19:
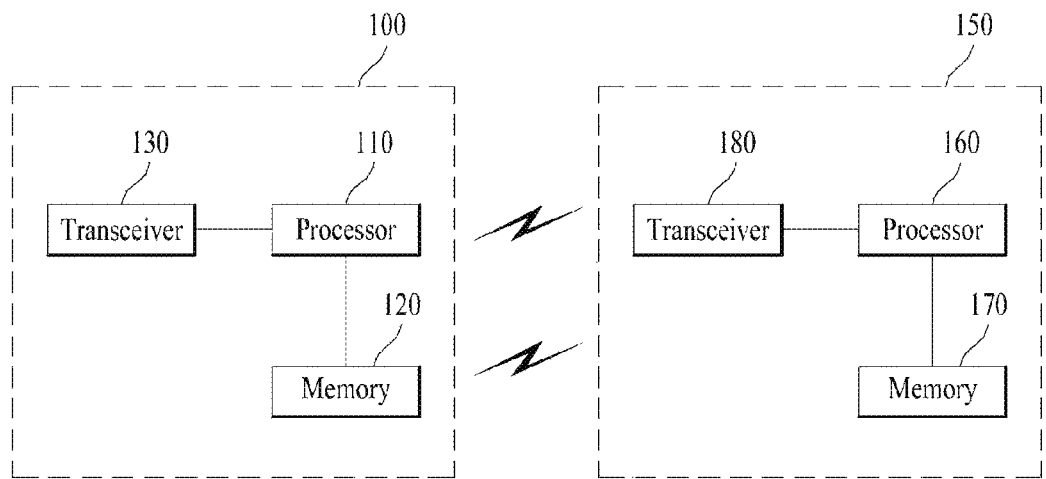
FIG. 19 is a diagram for explaining a device according to an embodiment of the present invention.

FIG. 19 is a diagram describing a device for implementing the above-described method.

A wireless device (100) of FIG. 19 may correspond to an initiator STA, which transmits a signal that is described in the description presented above, and a wireless device (150) may correspond to a responder STA, which receives a signal that is described in the description presented above. At this point, each station may correspond to a llay device (or user equipment (UE)) or a PCP/AP. Hereinafter, for simplicity in the description of the present invention, the initiator STA transmits a signal is referred to as a transmitting device (100), and the responder STA receiving a signal is referred to as a receiving device (150).

The transmitting device (100) may include a processor (110), a memory (120), and a transmitting/receiving unit (130), and the receiving device (150) may include a processor (160), a memory (170), and a transmitting/receiving unit (180). The transmitting/receiving unit (130, 180) transmits/receives a radio signal and may be operated in a physical layer of IEEE 802.11/3GPP, and so on. The processor (110, 160) may be operated in the physical layer and/or MAC layer and may be operatively connected to the transmitting/receiving unit (130, 180).

The processor (110, 160) and/or the transmitting/receiving unit (130, 180) may include application-specific integrated circuit (ASIC), other chipset, logic circuit and/or data processor. The memory (120, 170) may include read-only memory (ROM), random access memory (RAM), flash memory, memory card, storage medium and/or other storage unit. When the embodiments are executed by software, the techniques (or methods) described herein can be executed with modules (e.g., processes, functions, and so on) that perform the functions described herein. The modules can be stored in the memory (120, 170) and executed by the processor (110, 160). The memory (120, 170) can be implemented (or positioned) within the processor (110, 160) or external to the processor (110, 160). Also, the memory (120, 170) may be operatively connected to the processor (110, 160) via various means known in the art.

As described above, the detailed description of the preferred exemplary embodiment of the present invention is provided so that anyone skilled in the art can implement and execute the present invention. In the detailed description presented herein, although the present invention is described with reference to the preferred exemplary embodiment of the present invention, it will be understood by anyone having ordinary skills in the art that diverse modifications, alterations, and variations can be made in the present invention. Therefore, the scope and spirit of the present invention will not be limited only to the exemplary embodiments of the present invention set forth herein. Thus, it is intended to provide the broadest scope and spirit of the appended claims of the present invention that are equivalent to the disclosed principles and novel characteristics of the present invention.

The present invention is applicable to various wireless communication systems, including IEEE 802.11

What is claimed is:

1. A method of reporting channel information by a station (STA) in a wireless LAN (WLAN) system, the method comprising:

receiving a null data packet announcement (NDP-A) frame from a first access point (AP);

upon determining that the NDP-A frame is for joint transmission of a plurality of APs, measuring a channel for a first AP which has transmitted the NDP-A frame and a channel for at least one second AP channel which has not transmitted the NDP-A frame;

transmitting channel information for the plurality of APs, which has been acquired based on a result of the channel measurement, to the first AP; and receiving the plurality of NDP frames simultaneously from the plurality of APs after short inter-frame space (SIFS) from the NDP-A reception, wherein if the NDP-A frame is for the joint transmission, the STA acquires the channel information for the plurality of APs through a plurality of NDP frames received from the plurality of APs after receiving the NDP-A frame one time, wherein the NDP-A frame comprises at least one of an STA information field including an identifier of the STA, a joint transmission indicator including information on whether the NDP-A frame is for the joint transmission of the plurality of APs, an antenna configuration field, and a number of spatial streams, and wherein the antenna configuration field of the NDP-A frame comprises the number of transmission antennas for all of the plurality of APs, and the number of spatial streams of the NDP-A frame includes the number of spatial streams for all of the plurality of APs.

2. The method of claim 1, further comprising receiving a trigger frame from the first AP after reception of the plurality of NDP frames, wherein channel information on the plurality of APs is transmitted through a resource allocated through the trigger frame.

3. The method of claim 1, wherein a last NDP frame of the plurality of NDP frames comprises an indicator for the end of NDP frame transmission.

4. The method of claim 1, wherein the first AP is a master AP among the plurality of APs, and wherein the at least one second AP is a slave AP among the plurality of APs.

5. A station (STA) comprising:

a receiver;

a transmitter; and a processor for receiving a null data packet announcement (NDP-A) frame from a first access point (AP) through the receiver, measuring a channel for a first AP which has transmitted the NDP-A frame and a channel for at least one second AP channel which has not transmitted the NDP-A frame upon determining that the NDP-A frame is for joint transmission of a plurality of APs, and transmitting channel information for the plurality of APs, which has been acquired based on a result of the channel measurement, to the first AP through the transceiver, wherein if the NDP-A frame is for the joint transmission, the processor acquires the channel information for the plurality of APs through a plurality of NDP frames received from the plurality of APs after receiving the NDP-A frame one time, wherein the NDP-A frame comprises at least one of an STA information field including an identifier of the STA, a joint transmission indicator including information on whether the NDP-A frame is for the joint transmission of the plurality of APs, an antenna configuration field, and a number spatial streams, wherein the processor receives the plurality of NDP frames through the receiver simultaneously from the plurality of APs after short inter-frame space (SIFS) from the NDP-A reception, and wherein the antenna configuration field of the NDP-A frame comprises the number of transmission antennas for all of the plurality of APs, and the number of spatial streams of the NDP-A frame includes the number of spatial streams for all of the plurality of APs.

6. The STA of claim 5, wherein the processor receives a trigger frame from the first AP through the receiver after receiving the plurality of NDP frames, and wherein channel information on the plurality of APs is transmitted through a resource allocated through the trigger frame.

7. The STA of claim 5, wherein a last NDP frame of the plurality of NDP frames comprises an indicator for the end of NDP frame transmission.

* * * * *